United States Patent
Konno et al.

(10) Patent No.: US 6,695,434 B2
(45) Date of Patent: Feb. 24, 2004

(54) IMAGE PROCESSING APPARATUS, IMAGE PRINTING APPARATUS, AND CONTROL METHOD OF THE APPARATUSES

(75) Inventors: Yuji Konno, Kanagawa (JP); Hiroshi Tajika, Kanagawa (JP); Norihiro Kawatoko, Kanagawa (JP); Takayuki Ogasahara, Rochester, NY (US); Atsuhiko Masuyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/209,877

(22) Filed: Aug. 2, 2002

(65) Prior Publication Data

US 2003/0048322 A1 Mar. 13, 2003

(30) Foreign Application Priority Data

Aug. 8, 2001 (JP) ........................................ 2001/241263

(51) Int. Cl.$^7$ .............................. B41J 2/21; B41J 2/205
(52) U.S. Cl. ........................................... 347/43; 347/15
(58) Field of Search ............................. 347/43, 15, 19; 358/1.1, 1.9; 382/166

(56) References Cited

U.S. PATENT DOCUMENTS

| | | | |
|---|---|---|---|
| 4,313,124 A | 1/1982 | Hara ............................ | 347/57 |
| 4,345,262 A | 8/1982 | Shirato et al. ................. | 347/10 |
| 4,459,600 A | 7/1984 | Sato et al. ..................... | 347/47 |
| 4,463,359 A | 7/1984 | Ayata et al. .................... | 347/56 |
| 4,558,333 A | 12/1985 | Sugitani et al. ............... | 347/65 |
| 4,608,577 A | 8/1986 | Hori .............................. | 347/66 |
| 4,723,129 A | 2/1988 | Endo et al. .................... | 347/56 |
| 4,740,796 A | 4/1988 | Endo et al. .................... | 347/56 |
| 5,581,295 A * | 12/1996 | Prowak ........................ | 347/237 |
| 5,701,151 A * | 12/1997 | Plakosh ........................ | 347/247 |
| 5,729,625 A * | 3/1998 | Miyake ........................ | 347/184 |
| 6,198,543 B1 * | 3/2001 | Ryan ............................ | 358/1.9 |

FOREIGN PATENT DOCUMENTS

| | | |
|---|---|---|
| EP | 1 079 600 | 8/2000 |
| JP | 54-56847 | 5/1979 |
| JP | 56-123670 | 7/1984 |
| JP | 59-138461 | 8/1984 |
| JP | 60-71260 | 4/1985 |
| JP | 2001-69538 | 3/2001 |

* cited by examiner

Primary Examiner—Thinh Nguyen
(74) Attorney, Agent, or Firm—Fitzpatrick, Cella, Harper & Scinto

(57) ABSTRACT

This invention provides an image processing apparatus capable of outputting a color image by reducing the information amount of each color component of the image by a method suited to the color component without deteriorating the quality of the image, and an image printing apparatus capable of printing an image without deteriorating the quality of the image, on the basis of received image data. Of color image data to be transmitted to the image printing apparatus (which uses, e.g., six colors Y, M, C, Bk, LC, and LM), the image processing apparatus quantizes colors (LC and LM) whose tone quality is important by a large number of gray levels (e.g., nine values), and does not compress these colors. The image processing apparatus quantizes colors (Y, M, C, and Bk) whose tone quality is not important by the number of gray levels (e.g., five values) by which the compression efficiency is improved, and then compresses these colors, thereby reducing the transmission data amount. The image printing apparatus prints the image of received image data by directly using uncompressed data and expanding compressed data.

40 Claims, 19 Drawing Sheets

OUTPUT IMAGE DATA
1200×1200dpi
4bit(5-VALUED: FIG. 6, 9-VALUED: FIG. 8)
BINARY DATA INPUT IMAGE DATA
600×600dpi
8bit256GRAY LEVELS
MULTILEVEL DATA

FIG. 7B

GRAY LEVELS WHEN BOTH LIGHT INK AND DARK INK ARE USED
(EXAMPLE: WHEN DARK INK DENSITY IS TWICE LIGHT INK DENSITY)

| | | | | | | | | |
|---|---|---|---|---|---|---|---|---|
| NUMBER OF LIGHT INK DOTS | 0 | 1 | 2 | 3 | 4 | 3 | 2 | 1 | 0 |
| NUMBER OF DARK INK DOTS (CONVERTED INTO LIGHT INK) | 0 (0) | 0 (0) | 0 (0) | 0 (0) | 0 (0) | 1 (2) | 2 (4) | 3 (6) | 4 (8) |
| TOTAL NUMBER OF DOTS CONVERTED INTO LIGHT INK | 0 | 1 | 2 | 3 | 4 | 5 | 6 | 7 | 8 |

LIGHT INKS: LIGHT CYAN, LIGHT MAGENTA
DARK INKS: CYAN, MAGENTA

LIGHT INK DENSITY : DARK INK DENSITY = 1 : 2

FIG. 7C

GRAY LEVELS WHEN LIGHT INK ALONE IS USED (DISCHARGE RESOLUTION OF LIGHT INK IS DOUBLED)

| | 0 | 1 | 2 | 3 | 4 | 5 | 6 | 7 | 8 |
|---|---|---|---|---|---|---|---|---|---|
| NUMBER OF LIGHT INK DOTS | 0 | 1 | 2 | 3 | 4 | 5 | 6 | 7 | 8 |
| NUMBER OF DARK INK DOTS | 0 | 0 | 0 | 0 | 0 | 0 | 0 | 0 | 0 |
| TOTAL NUMBER OF DOTS CONVERTED INTO LIGHT INK | 0 | 1 | 2 | 3 | 4 | 5 | 6 | 7 | 8 |

LIGHT INKS: LIGHT CYAN, LIGHT MAGENTA
DARK INKS: CYAN, MAGENTA

4 × BINARY DOT PATTERNS FOR LIGHT INK

FIG. 11

LOOKUP TABLE

| 3n＼3n+1 | 000 | 001 | 010 | 011 | 100 |
|---|---|---|---|---|---|
| 000 | 00000 | 00101 | 01010 | 01111 | 10100 |
| 001 | 00001 | 00110 | 01011 | 10000 | 10101 |
| 010 | 00010 | 00111 | 01100 | 10001 | 10110 |
| 011 | 00011 | 01000 | 01101 | 10010 | 10111 |
| 100 | 00100 | 01001 | 01110 | 10011 | 11000 |

(CONVERSION OF 3 BITS × 2 → 5 BITS)

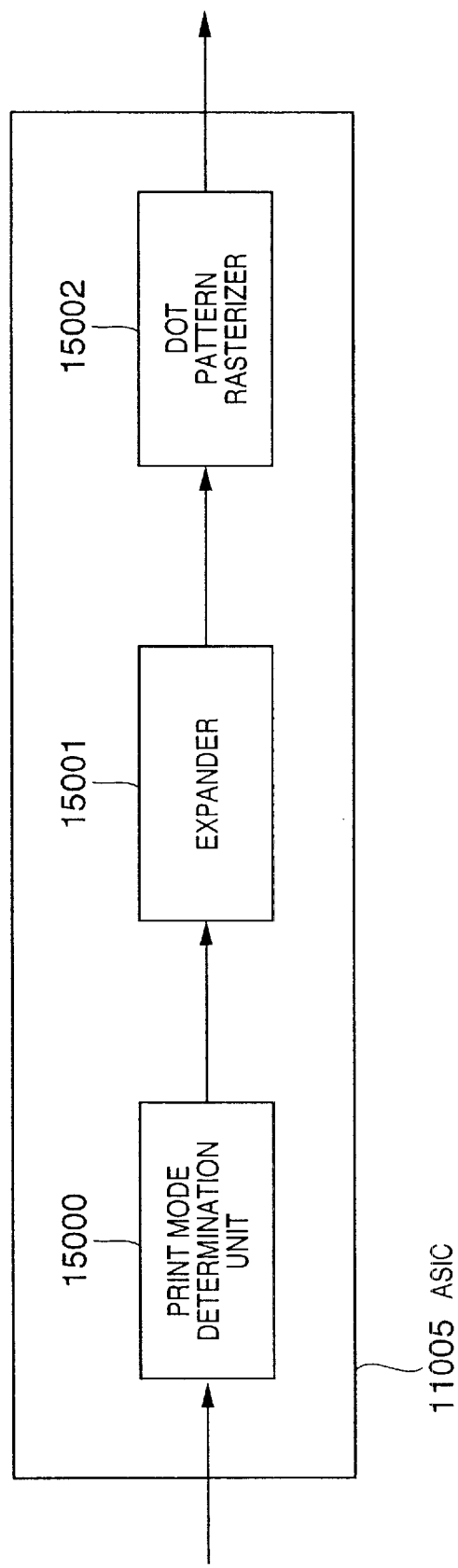

FIG. 16

| | COMPRES-SION MODE FLAG | FLAG INDICATING NUMBER OF GRAY LEVELS AND COM-PRESSION OF Y | FLAG INDICATING NUMBER OF GRAY LEVELS AND COM-PRESSION OF M | FLAG INDICATING NUMBER OF GRAY LEVELS AND COM-PRESSION OF C | FLAG INDICATING NUMBER OF GRAY LEVELS AND COM-PRESSION OF K | FLAG INDICATING NUMBER OF GRAY LEVELS AND COM-PRESSION OF LC | FLAG INDICATING NUMBER OF GRAY LEVELS AND COM-PRESSION OF LM |
|---|---|---|---|---|---|---|---|
| PRINT MODE 1 | 01 | 05 01 | 05 01 | 05 01 | 05 01 | 05 01 | 05 01 |
| PRINT MODE 2 | 02 | 05 01 | 05 01 | 05 01 | 05 01 | 09 00 | 09 00 |
| PRINT MODE 3 | 00 | 09 00 | 09 00 | 09 00 | 09 00 | 09 00 | 09 00 |

IMAGE PROCESSING APPARATUS, IMAGE PRINTING APPARATUS, AND CONTROL METHOD OF THE APPARATUSES

FIELD OF THE INVENTION

The present invention relates to an image processing apparatus, an image printing apparatus, a control method of these apparatuses, a printer driver, and a storage medium and, more particularly, to an image processing apparatus, an image printing apparatus, a control method of these apparatuses, a printer driver, and a storage medium by which, in an image printing apparatus for processing color images, the volume of image data can be reduced by determining the number of gray levels of each color from the possible memory capacity and the data amount to be transferred, and, for a compressible color, by compressing image data to be transferred beforehand by a printing processor.

BACKGROUND OF THE INVENTION

For example, when a printer such as an inkjet printer by which the number of gray levels which can be output is extremely limited is to be used, the number of gray levels of image data is converted into the number of gray levels expressible by the printer by quantization performed by a printer driver on a host computer. After that, the image data is transferred from the host computer to the printer.

However, along with a recent increase in resolution of printers, the amount of image data to be transferred increases, and this increases the time required to transfer image data from a host computer to a printer. This may lead to a decrease in printing throughput.

To solve this problem, a density pattern method is used. That is, a printer driver on a host computer sends only tone information of the density pattern to a printer. The printer converts the received density pattern tone information into a dot pattern.

In this method, the host computer does not directly transfer binary data to the printer but transfers only tone information of the density pattern. This reduces the data amount to be transferred.

For example, assuming that the resolution of a printer is 1,200 dpi and the density pattern is formed every four dots, i.e., two in each of vertical and horizontal directions, which are output from the printer, five gray levels can be expressed as shown in FIG. 6.

That is, the printer driver performs 5-valued quantization for 600-dpi pixel information. For quantization errors generated by this quantization, dot area modulation represented by error diffusion is performed.

The printer driver performs this processing before sending binary data directly to the printer, and transmits only the quantized tone in formation to the printer. By this processing alone, a continuous-tone image can be output to the printer in a pseudo manner. This reduces the data amount transferred from the host computer to the printer, and makes it possible to express a continuous-tone image without deteriorating the image quality.

To transfer image data from the host computer to the printer by using the density pattern method described above, the above-mentioned 5-valued quantized data is expressed by a quantized code having a predetermined bit length. This quantized code is then packed and transferred.

In connection with this packing process, the bit length of the quantized code is, e.g., two bits, four bits, or eight bits (since the data transfer unit is eight bits or sixteen bits). For 5-valued quantized data, a 4-bit quantized code is used.

In the case of 5-valued quantized data, therefore, tone information containing only five of sixteen values as a maximum number of gray levels expressible by four bits is used (the eleven remaining values are unused). This results in very redundant information.

Even this highly redundant information which expresses five gray levels by four bits poses no problem, if a somewhat low data transfer rate is permissible or if the printer has a large memory capacity. However, if the printer is to print data with high resolution at high speed or if the memory capacity of the printer must be reduced in order to reduce the cost of the printer, the data transfer rate or the data amount storable by the printer is important.

That is, it is very inefficient to transfer to the printer highly redundant information which expresses five gray levels by four bits.

To avoid this problem without changing the unit density pattern, it is possible to reduce the number of gray levels from five to four, thereby reducing the number of bits of the quantized code to two. However, reducing the number of gray levels causes discontinuous gray levels, forms pseudo contours, or increases graininess, thereby undesirably lowering the quality of the output image.

To solve the above problem, the prevent inventors disclosed another technique in Japanese Patent Laid-Open No. 2001-69358. This disclosure is related to a compression process which packs 12-bit data formed by gathering 5-valued, 4-bit data of three pixels into eight bits. This compression process can reduce the redundancy of an information amount without deteriorating the image quality.

Unfortunately, a problem sometimes arises when the above compression process is applied to a 6-color ink system which is used in recent high-quality inkjet printers to achieve high image quality.

That is, in this 6-color ink system aiming at high image quality, each ink color must be processed with an optimum number of gray levels.

This will be explained with reference to FIGS. 7A to 7C. The 6-color ink system for achieving high image quality uses inks of four colors, i.e., yellow, magenta, cyan, and black, and, in order to increase the number of gray levels, uses inks of two other colors, i.e., light cyan and light magenta lighter than cyan and magenta, respectively. Yellow, magenta, cyan, black, light cyan, and light magenta will be respectively referred to as Y, M, C, K, LC, and LM hereinafter. Also, light cyan and light magenta will be generally called light inks, and cyan ink and magenta ink darker than light cyan and light magenta will be generally called dark inks.

FIG. 7A shows an example of the relationship between the input signal and the ink discharge amount in a tone generating system using both light ink (LC or LM) and dark ink (C or M). FIG. 7A also shows an example of the relationship between the input signal and the ink discharge amount when only light ink (LC or LM) is used.

As shown in FIG. 7A, assuming that the ink discharge amount when one dot is formed at a resolution of 1,200 dpi is 100%, the following discharge amount characteristic is used. That is, as shown by a light ink discharge amount characteristic 1 indicated by the dotted line, the light ink alone is used until 100%. As shown by a dark ink discharge amount characteristic 1 indicated by the alternate long and short dashed line, the dark ink begins to be discharged when the light ink reaches 100%. The discharge amounts of the light ink and dark ink are gradually reduced and increased, respectively, and finally the dark ink reaches 100%.

Assume that ink discharge amounts of 80 to 100, 60 to 80, 40 to 60, 20 to 40, and 0 to 20% of the light ink or dark ink explained above correspond to 4 dots, 3 dots, 2 dots, 1 dot, and 0 dot, respectively, shown in FIG. 6, and that the dark ink density is twice the light ink density. In this case, nine gray levels from 0 to 8 shown in FIG. 7B can be expressed by controlling the discharge amounts of the light ink and dark ink as represented by the light ink discharge amount characteristic 1 and the dark ink discharge amount characteristic 1 shown in FIG. 7A.

Note that this example shown in FIG. 7A is merely an example, so the characteristics can also be nonlinear ones rather than linear ones as shown in FIG. 7A. Also, the characteristics can change in accordance with hue. Furthermore, the ratio of the dark ink density to the light ink density need not be twice and can be appropriately changed.

No problem arises when the density balance between the dark ink density and the light ink density is satisfactory (in the above example, when the dark ink density is accurately controlled to be twice the light ink density), and so the start of dark ink discharge is inconspicuous. However, if the light ink is much lighter than the dark ink or the dark ink is much darker than the light ink, the graininess of the dark ink is sometimes conspicuous at the start of ink discharge.

If this is the case, the light ink discharge amount is raised to 200% as shown by a light ink discharge amount characteristic 2 indicated by the solid line in FIG. 7A. This increases the solid density when data is printed only with this light ink, and improves connection with the dark ink. Consequently, connection between the dark ink and the light ink improves.

FIG. 8 shows examples of density patterns until 200% discharge by the light ink discharge amount characteristic 2 using the light ink. Assume that ink discharge amounts of 180 to 200, 160 to 180, 140 to 160, 100 to 120, 60 to 80, 40 to 60, 20 to 40, and 0 to 20% of the light ink shown in FIG. 7A correspond to 8 dots, 7 dots, 6 dots, 5 dots, 4 dots, 3 dots, 2 dots, 1 dot, and 0 dot, respectively, shown in FIG. 8, and that the dark ink density is twice the light ink density. In this case, nine gray levels from 0 to 8 shown in FIG. 7C can be expressed by controlling the discharge amount of the light ink as represented by the light ink discharge amount characteristic 2 shown in FIG. 7A.

Note that this example shown in FIG. 7A is merely an example, so the characteristics can also be nonlinear ones rather than linear ones as shown in FIG. 7A. Also, the characteristics can change in accordance with hue.

As shown in FIG. 8, an ink discharge amount of 200% is realized by making the resolution twice that when the maximum ink discharge amount is 100% shown in FIG. 6. The density pattern shown in FIG. 8 has 4×2 dots. Therefore, the number of gray levels is 9 from 0 to 8 as shown in FIG. 8.

Compared to five values, nine values have small redundancy of an information amount in four bits. Additionally, since nine values cannot be compressed as efficiently as five values, the system merit improves when no such compression process as performed for five values is performed for nine values.

Unfortunately, if the number of gray levels of each of all six colors is unconditionally converted to nine values as explained above and these nine values are processed every four bits without being compressed, the initially stated problems of the transfer data amount and the data storage area arise when the data is transferred from the host computer to the printer.

SUMMARY OF THE INVENTION

The present invention has been proposed to solve the conventional problems, and has as its object to provide an image processing apparatus and image processing method capable of outputting a color image to an image printing apparatus by reducing the information amount of each color component of the image by a method suited to the color component without deteriorating the quality of the image.

It is another object of the present invention to provide an image printing apparatus and its control method capable of printing a color image without deteriorating the quality of the image, on the basis of output image data from the image processing apparatus described above.

To achieve the above objects, an image processing apparatus according to the present invention has the following arrangements.

That is, an image processing apparatus for outputting multilevel color image data by reducing the information amount of the data, comprising; first quantizing means for quantizing a color component of the multilevel color image data into N1 values, and outputting the color component as a K1-bit code capable of expressing the N1 values; second quantizing means for quantizing a color component of the multilevel color image data into N2 values larger than the N1 values, and outputting the color component as a K2-bit code capable of expressing the N2 values; quantization selecting means for selecting one of the first and second quantizing means in accordance with a color component of the multilevel color image data; converting means for collecting the K1-bit codes of M pixels and converting the collected K1-bit codes into a code having L1 bits less than K1×M, if the quantization selecting means selects the first quantizing means; and output means for collectively outputting output data from the converting means as data formed for every predetermined number of bits.

Preferably, in the image processing apparatus described above, if the second quantizing means is selected, the K2-bit code is output without being converted.

Preferably, in the image processing apparatus described above, the quantization selecting means uses the first quantizing means for a color component to be printed in ink having a relatively high density, and uses the second quantizing means for a color component to be printed in ink having a relatively low density.

Preferably, in the image processing apparatus described above, the low-density color components are light cyan and light magenta, and the high-density color components are cyan, magenta, yellow, and black.

Preferably, in the image processing apparatus described above, the predetermined number of bits is a natural multiple of the L1 bits, and the data formed for every predetermined number of bits is transferred to an image printing apparatus.

Preferably, in the image processing apparatus described above, the quantization selecting means comprises selecting means for selecting one of the first and second quantizing means on the basis of a print mode which designates selection of one of the first and second quantizing means.

Preferably, in the image processing apparatus described above, the selecting means selects one of the first and second quantizing means in accordance with one of a type of printing apparatus for outputting the image data, a type of medium, and a resolution.

To achieve the above objects, an image printing apparatus according to the present invention has the following arrangements.

That is, an image printing apparatus for printing an image on the basis of color image data output by reducing the information amount thereof, comprising; separating means for separating the color image data into a compressed code and an uncompressed code for every predetermined number of bits, in accordance with color components of the color image data; restoring means for restoring the compressed code separated by the separating means; and image printing means for printing the image by using the uncompressed code and the restored code.

Preferably, in the image printing apparatus described above, the compressed code is formed by collecting K1-bit codes, capable of expressing N1 values, of M pixels, and compressing the collected K1-bit codes into a code having L1 bits less than K1×M, and the uncompressed code is a K2-bit code capable of expressing N2 values.

Preferably, in the image printing apparatus described above, the restoring means restores the compressed L1 bit code into the K1-bit codes of M pixels.

Preferably, in the image printing apparatus described above, the image printing means prints the image by using the K2-bit code and the K1-bit code.

Preferably, in the image printing apparatus described above, of color components of the color image data, the compressed code is a color component to be printed in ink having a relatively high density, and the uncompressed code is a color component to be printed in ink having a relatively low density.

Preferably, in the image printing apparatus described above, the low-density color components are light cyan and light magenta inks, and the high-density color components are cyan, magenta, yellow, and black inks.

Preferably, in the image printing apparatus described above, the predetermined number of bits is a natural multiple of the L1 bits.

Preferably, in the image printing apparatus described above, a printing operation is performed using a printhead.

Preferably, in the image printing apparatus described above, the printhead comprises a plurality of printing elements including an electrothermal converter which generates thermal energy as energy for discharging ink.

To achieve the above objects, a printer driver according to the present invention has the following arrangements.

That is, a printer driver which is executed by an information processing apparatus, and which outputs, to an image printing apparatus, multilevel color image data to be printed by reducing the information amount of the data, comprising; a first quantization module for quantizing a color component of the multilevel color image data into N1 values, and outputting the color component as a K1-bit code capable of expressing the N1 values; a second quantization module for quantizing a color component of the multilevel color image data into N2 values larger than the N1 values, and outputting the color component as a K2-bit code capable of expressing the N2 values; a quantization selecting module for selecting one of the first and second quantization modules in accordance with a color component of the multilevel color image data; a converting module for collecting the K1-bit codes of M pixels and converting the collected K1-bit codes into a code having L1 bits less than K1×M, if the quantization selecting module selects the first quantization module; a non-converting module for outputting the K2-bit code without conversion if the quantization selecting module selects the second quantization module; and an output module for collectively outputting output data from the converting and non-converting modules as data formed for every predetermined number of bits.

Preferably, in the printer driver described above, the quantization selecting module uses the first quantization module for a color component to be printed in ink having a relatively high density, and uses the second quantization module for a color component to be printed in ink having a relatively low density.

Preferably, in the printer driver described above, the low-density color components are light cyan and light magenta, and the high-density color components are cyan, magenta, yellow, and black.

Preferably, in the printer driver described above, the predetermined number of bits is a natural multiple of the L1 bits, and the data formed for every predetermined number of bits is transferred to an image printing apparatus.

Preferably, in the printer driver described above, the quantization selecting module comprises a selecting module for selecting one of the first and second quantization modules on the basis of a print mode which designates selection of one of the first and second quantization modules.

Preferably, in the printer driver described above, the selecting module selects one of the first and second quantization modules in accordance with one of a type of printing apparatus for outputting the image data, a type of medium, and a resolution.

To achieve the above objects, an image processing apparatus control method according to the present invention has the following arrangement.

That is, a control method of an image processing apparatus for outputting multilevel color image data by reducing the information amount of the data, comprising; the first quantization step of quantizing a color component of the multilevel color image data into N1 values, and outputting the color component as a K1-bit code capable of expressing the N1 values; the second quantization step of quantizing a color component of the multilevel color image data into N2 values (N2>N1), and outputting the color component as a K2-bit code capable of expressing the N2 values; the quantization selecting step of selecting one of the first and second quantization steps in accordance with a color component of the multilevel color image data; the conversion step of collecting the K1-bit codes of M pixels and converting the collected K1-bit codes into a code having L1 (K1×M>L1) bits, if the first quantization step is selected in the quantization selecting step; and the output step of collectively outputting output data from the conversion step as data formed for every predetermined number of bits.

To achieve the above objects, an image printing apparatus control method according to the present invention has the following arrangement.

That is, a control method of an image printing apparatus for printing an image on the basis of color image data which is output by reducing the information amount thereof, comprising; the separation step of separating the color image data into a compressed code and an uncompressed code for every predetermined number of bits, in accordance with color components of the color image data; the restoration step of restoring the compressed code separated in the separation step; and the image printing step of printing the image by using the uncompressed code and the restored code.

To achieve the above objects, a program according to the present invention executes the following program module.

That is, a program capable of executing on a computer a control method of an image processing apparatus for outputting multilevel color image data by reducing the information amount of the data, wherein the program executes; a first quantization module for quantizing a color component of the multilevel color image data into N1 values, and outputting the color component as a K1-bit code capable of expressing the N1 values; a second quantization module for quantizing a color component of the multilevel color image data into N2 (N2>N1) values, and outputting the color component as a K2-bit code capable of expressing the N2 values; a quantization selecting module for selecting one of the first and second quantization modules in accordance with a color component of the multilevel color image data; a conversion module for collecting the K1-bit codes of M pixels and converting the collected K1-bit codes into a code having L1 (K1×M>L1) bits, if the quantization selecting module selects the first quantization module; and an output module for collectively outputting output data from the conversion module as data formed for every predetermined number of bits.

Alternatively, a program capable of executing on a computer a control method of an image processing apparatus for outputting multilevel color image data by reducing the information amount of the data, wherein the program executes; a separation module for separating the color image data into a compressed code and an uncompressed code for every predetermined number of bits, in accordance with color components of the color image data; a restoration module for restoring the compressed code separated by the processing by the separation module; and an image printing module for printing the image by using the uncompressed code and the restored code.

To achieve the above objects, a storage medium according to the present invention has the following program module.

That is, a computer-readable recording medium for executing a control method of an image processing apparatus for outputting multilevel color image data by reducing the information amount of the data, comprising; a first quantization module for quantizing a color component of the multilevel color image data into N1 values, and outputting the color component as a K1-bit code capable of expressing the N1 values; a second quantization module for quantizing a color component of the multilevel color image data into N2 (N2>N1) values, and outputting the color component as a K2-bit code capable of expressing the N2 values; a quantization selecting module for selecting one of the first and second quantization modules in accordance with a color component of the multilevel color image data; a conversion module for collecting the K1-bit codes of M pixels and converting the collected K1-bit codes into a code having L1 (K1×M>L1) bits, if the quantization selecting module selects the first quantization module; and an output module for collectively outputting output data from the conversion module as data formed for every predetermined number of bits.

Alternatively, a computer-readable recording medium for executing a control method of an image processing apparatus for outputting multilevel color image data by reducing the information amount of the data, comprising; a separation module for separating the color image data into a compressed code and an uncompressed code for every predetermined number of bits, in accordance with color components of the color image data; a restoration module for restoring the compressed code separated by the processing by the separation module; and an image printing module for printing the image by using the uncompressed code and the restored code.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7B is a view for explaining the relationship between the number of dots and the tone when both the dark ink and light ink are used;

FIG. 7C is a view for explaining the relationship between the number of dots and the tone when the light ink alone is used;

FIG. 11 is a view showing an example of a conversion table of a lookup table shown in FIG. 9;

FIG. 15 is a block diagram for explaining the arrangement of a data rasterizer according to the second embodiment of the present invention; and FIG. 16 is a view for explaining examples of header information, for different print modes, to be attached to processed image data according to the second embodiment of the present invention.

DETAILED DESCRIPTION OF THE PREFERRED EMBODIMENTS

Preferred embodiments of the present invention will now be described in detail in accordance with the accompanying drawings.

An image processing system including an image processing apparatus and image printing apparatus of an embodiment according to the present invention will be described below with reference to the accompanying drawings.

This embodiment will be explained by using a host computer as the image processing apparatus and a serial type inkjet printer as the image printing apparatus. However, the scope of the present invention is not limited to the described embodiment.

First Embodiment

Figure 2A:
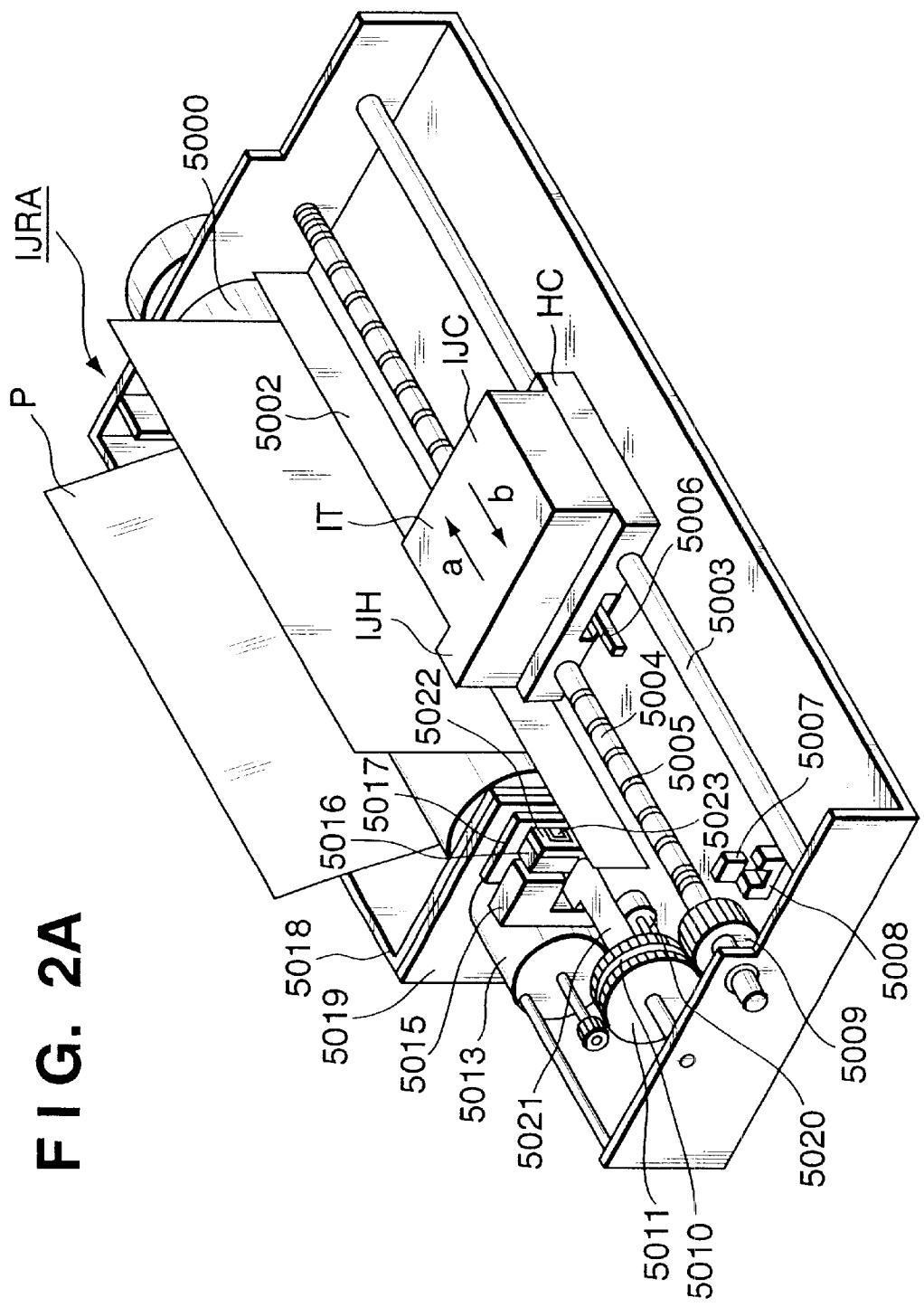
FIG. 2A is an external appearance perspective view showing an outline of the arrangement of the image printing apparatus according to the embodiment.

Arrangement of Inkjet Printer: FIG. 2A

FIG. 2A is an external appearance perspective view showing an outline of the arrangement of an inkjet printer IJRA.

Referring to FIG. 2A, a carriage HC engages with a spiral groove 5004 of a lead screw 5005 which rotates via driving force transmission gears 5009 to 5011 in accordance with forward and reverse rotations of a driving motor 5013. This carriage HC has a pin (not shown) and moves back and forth along the directions of arrows a and b as it is supported by a guide rail 5003.

An integrated inkjet cartridge IJC incorporating a printhead IJH and an ink tank IT is mounted on the carriage HC. Printing is performed by the reciprocating motion of the carriage HC.

A paper press plate 5002 presses a printing sheet P against a platen 5000 over the entire moving range of the carriage HC.

Photocouplers 5007 and 5008 are home position sensors which sense the presence of a lever 5006 of the carriage in this region to switch the rotational directions of the motor 5013.

A member 5016 supports a cap member 5022 which caps the front surface of the printhead IJH. A suction device 5015 draws the interior of this cap by suction. This suction device 5015 performs printhead suction recovery via a cap hole 5023.

A cleaning blade 5017 is moved forward and backward by a member 5019. These cleaning blade 5017 and member 5019 are supported by a main body support plate 5018. Note that a well-known cleaning blade can also be used as the blade of this embodiment.

A lever 5021 starts suction of the suction recovery. This lever 5021 moves along with the movement of a cam 5020 which engages with the carriage, and the driving force from the driving motor is controlled by a known transmitting mechanism such as clutch switching.

The capping, cleaning, and suction recovery described above are performed in respective corresponding positions by the action of the lead screw 5005 when the carriage comes to the region on the home position side. However, any setting can be applied to this embodiment, provided that each desired operation is performed at a well-known timing.

Figure 1:
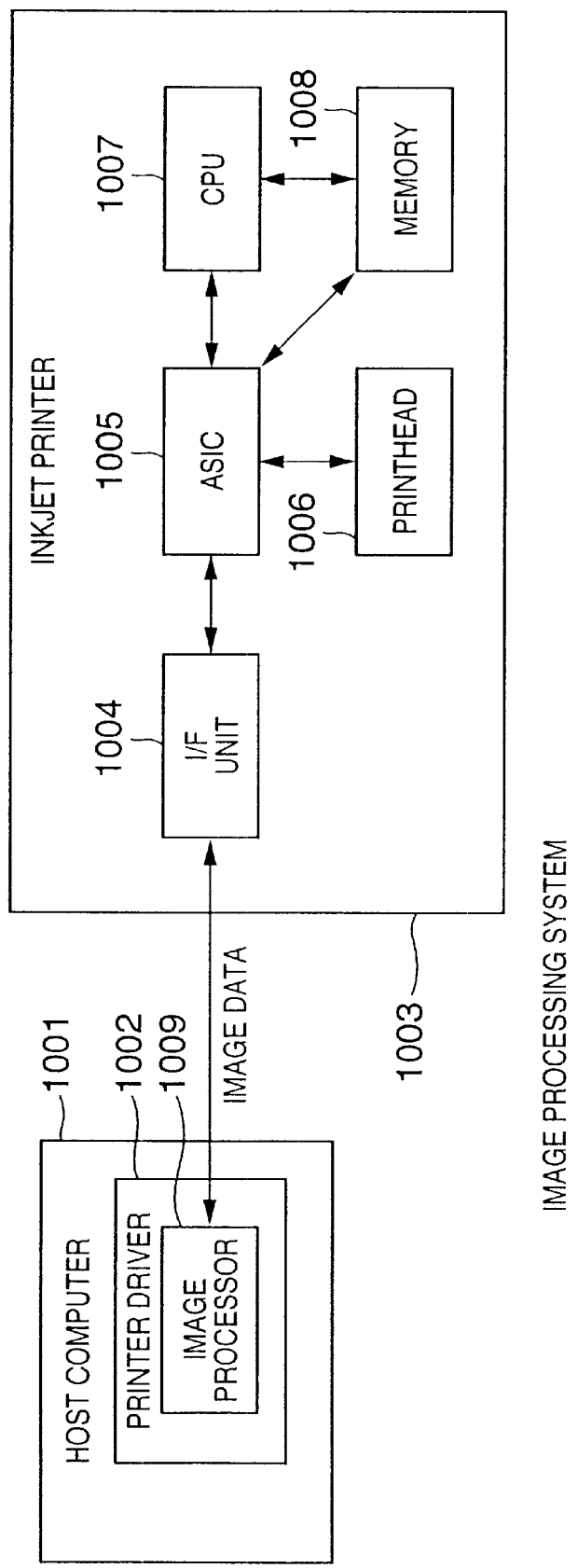
FIG. 1 is a block diagram for explaining the whole configuration of an image processing apparatus and image printing apparatus according to an embodiment of the present invention.

Arrangement of Image Processing System: FIG. 1

FIG. 1 is a block diagram showing the arrangement of the image processing system of this embodiment. FIG. 1 also shows the flow of image data formed on a host computer 1001 and transmitted to an inkjet printer 1003.

This inkjet printer 1003 usually forms image data required for inkjet printer output by using a printer driver 1002 in the host computer 1001. The printer driver 1002 has an image processor 1009 which performs necessary image processing.

Figure 3:
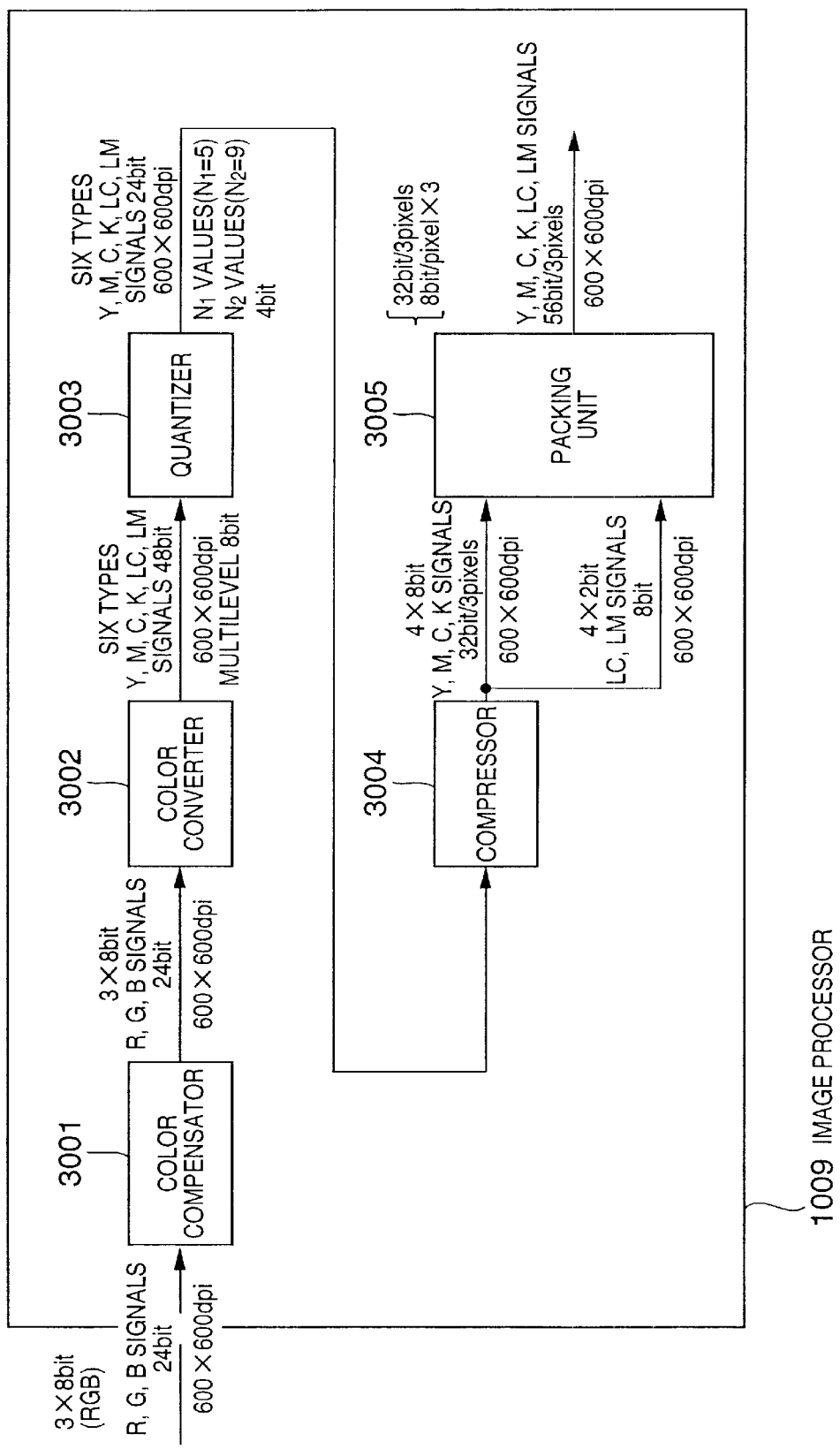
FIG. 3 is a block diagram for explaining the arrangement of an image processor of a printer driver according to the embodiment of the present invention.

Arrangement of Image Processor: FIG. 3

The internal processing configuration of the image processor 1009 will be explained below with reference to FIG. 3.

A color compensator 3001 performs color compensation for 8 bits of each of input image data R, G, and B, i.e., a total of 24 bits. This processing is multilevel conversion from 24 bits of R, G, and B into 24 bits of R, G, and B.

A color converter 3002 converts the color-compensated 8-bit input image data R, G, and B into colors which can be output by the inkjet printer, e.g., yellow, magenta, cyan, black, light cyan, and light magenta (to be referred to as Y, M, C, K, LC, and LM, respectively, hereinafter).

This processing is multilevel conversion from 8 bits of each of R, G, and B, i.e., a total of 24 bits into 8 bits of each of Y, M, C, K, LC, and LM, i.e., a total of 48 bits.

A quantizer 3003 performs conversion into the number of gray levels which can be output by the inkjet printer. In this embodiment, the quantizer 3003 converts 8 bits of each of Y, M, C, K, LC, and LM, i.e., a total of 48 bits into 4 bits of each of these colors, i.e., a total of 24 bits. (Note that the relationship between the number of gray levels and the number of bits will be described later, so a detailed explanation thereof will be omitted.)

Arrangement of Inkjet Printer: FIG. 1

Referring back to FIG. 1, image data processing in the inkjet printer 1003 will be explained.

An I/F unit 1004 of this inkjet printer 1003 receives image data from the host computer 1001, and transmits necessary data from the inkjet printer 1003 to the host computer 1001 at predetermined timings.

An ASIC 1005 controls various devices such as motors (not shown) and sensors (not shown) in the inkjet printer 1003. This ASIC 1005 also stores image data transmitted from the host computer 1001 in a memory 1008 via a CPU 1007 or directly by using DMR (Direct Memory Access). In printing, the ASIC 1005 loads necessary data from the memory 1008 and transfers data to be printed to a printhead 1006.

Figure 2B:
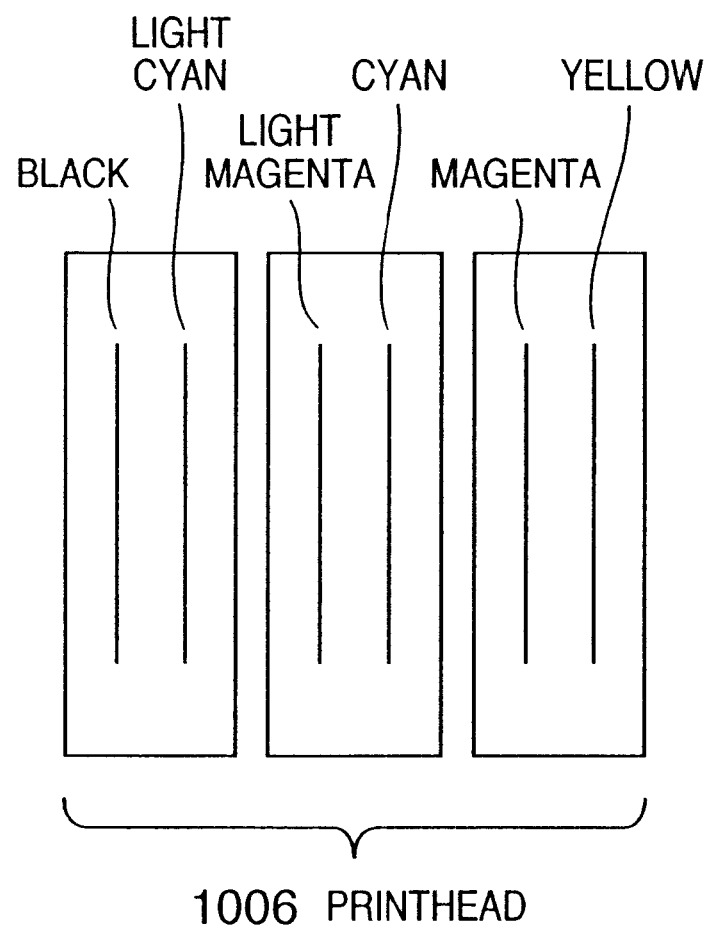
FIG. 2B is a view for explaining the arrangement of a printhead of the present invention.

As shown in FIG. 2B, this printhead 1006 is a 6-color head using Y, M, C, K, LC, and LM, in which three 2-color chips are juxtaposed. A Y head prints data by using yellow ink. Likewise, M, C, K, LC, and LM heads print data by using magenta, cyan, black, light cyan, and light magenta inks, respectively. This printhead has 512 nozzles for each color. That is, two rows of 256 nozzles at a nozzle pitch of 600 dpi are arranged so that these nozzles are staggered. In this manner, a resolution of 1,200 dpi is realized.

To the printhead 1006, 6-color print data is transferred from the ASIC 1005 simultaneously with head control signals, e.g., a heat enable signal and a block enable signal, necessary for printing.

Relationship between Output Data from Image Processor and Data Used by Printhead Next, the relationship between data to be printed by the printhead 1006 and data processed by the image processor 1009 of the printer driver will be explained below.

In the following description, assume that the inkjet printer 1003 has an output resolution of 1,200×1,200 dpi in a main scan direction, and that a droplet output from each nozzle is a very small one of 4 pl. Under the conditions, the number of gray levels of the printhead is two.

Note that output image data from the printer driver 1002 can also be output as a binary image of 1,200×1,200 dpi from the inkjet printer 1003. In this case, however, the processing load becomes enormous, and the transfer data amount also increases. Therefore, image data output from the printer driver 1002 to the inkjet printer 1003 is generally subjected to multilevel processing of 600×600 dpi.

This is so because even if the processing resolution is increased to be higher than 600 dpi (e.g., 1,200 dpi), the human visual characteristics cannot perceive the difference. To improve the image quality, an information amount exceeding 600 dpi is preferably used to express gray level differences.

Input and Output Image Data of Image Processor: FIG. 4

Figures 4A, 4B:
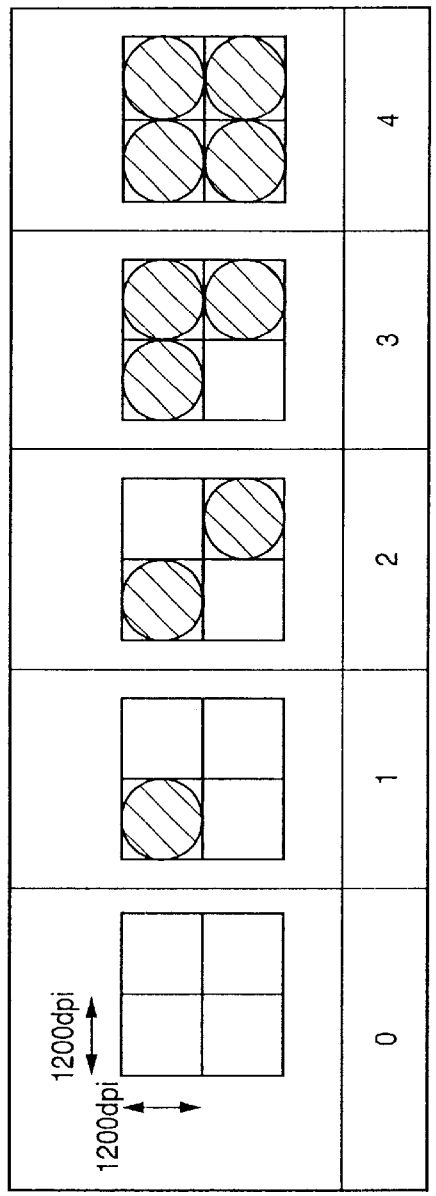
FIGS. 4A and 4B are views for explaining the relationship between the input multilevel data and the output code.

FIGS. 4A and 4B show the relationship between the resolutions of input image data and output image data.

Input image data (FIG. 4A) to the image processor 1009 is 600×600-dpi multilevel data having 8 bits=256 gray levels. The input image data is subjected to processing by the units shown in FIG. 3 for each color while the resolution and bit length remain the same. That is, the input image data is subjected to color compensation by the color compensator 3001 and cover conversion by the color converter 3002, and converted into code information for selecting a density pattern having an output resolution of 1,200×1,200 dpi by the quantizer 3003 (FIG. 4B).

Figure 6:
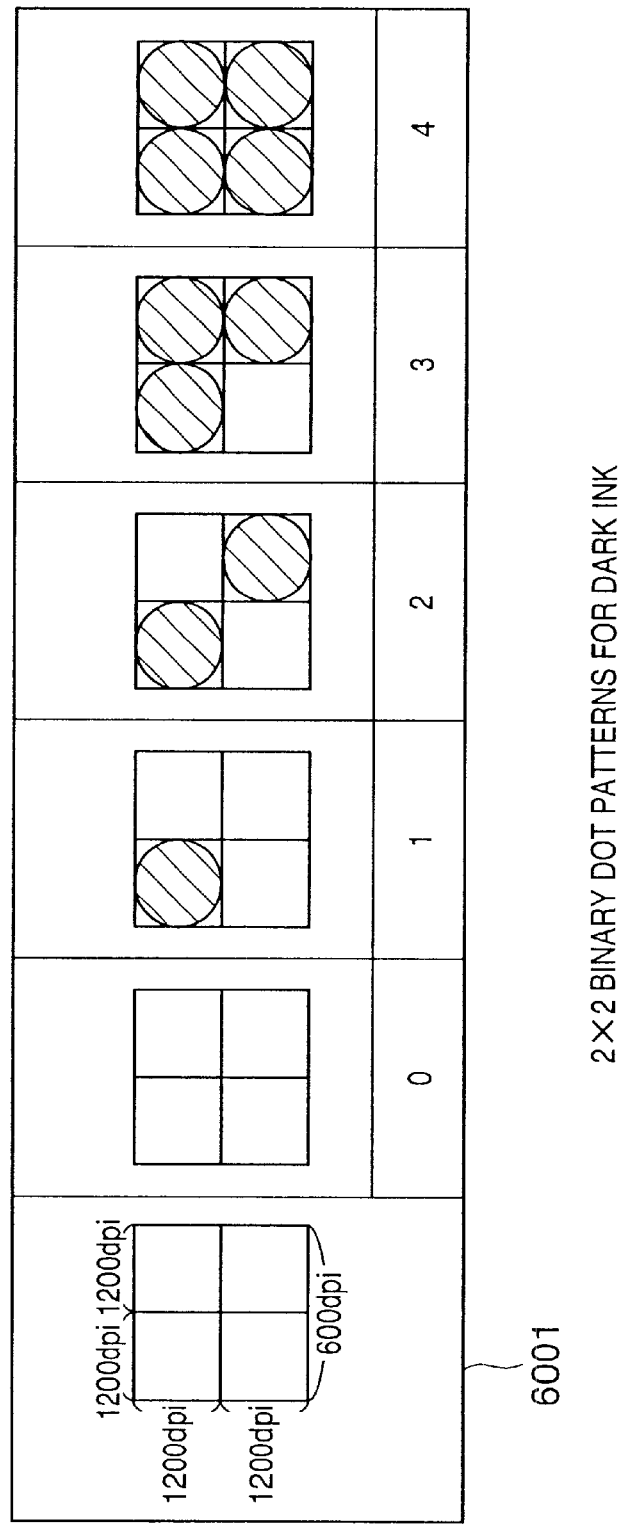
FIG. 6 is a view for explaining examples of 5-valued dot patterns according to the first embodiment.
Figure 8:
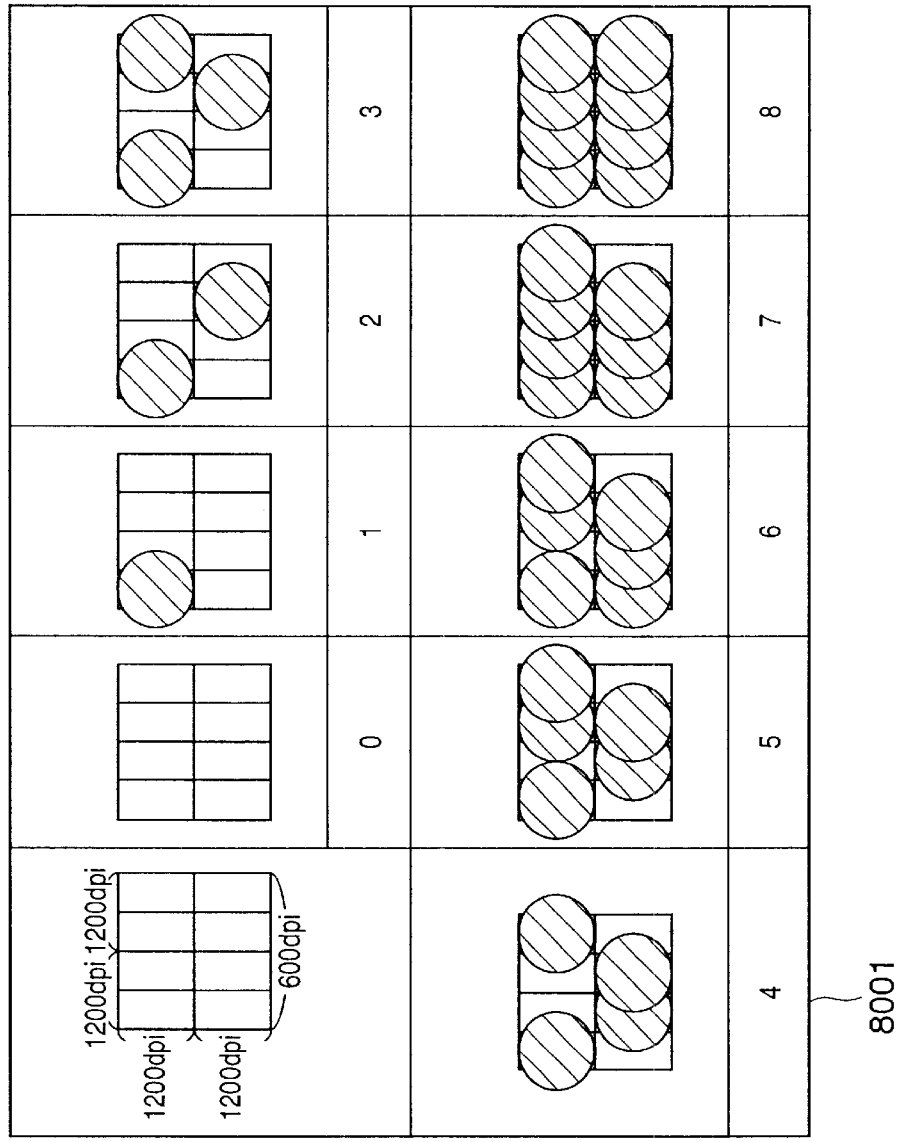
FIG. 8 is a view for explaining examples of 9-valued dot patterns according to the first embodiment.

In this embodiment, for each of Y, M, C, K, LC, and LM, the input image data is converted into code information for selecting a 2×2 or 4×2 binary dot pattern shown in FIG. 6 or 8.

That is, the input image data is converted into code information having five values from 0 to 4 indicated by 6001 in FIG. 6, or converted into code information having nine values from 0 to 8 indicated by 8001 in FIG. 8. Each code information indicates a gray level when the inkjet printer as an output apparatus outputs a dot pattern corresponding to the code information.

If the input multilevel data having 256 gray levels is simply quantized into five values or nine values, image deterioration by quantization errors is significant. Therefore, the quantizer 3003 performs dot area modulation such as error diffusion or dither processing for saving the tone. By this processing, the number of gray levels of each pixel is largely reduced to five or nine. However, density information having 256 gray levels is saved in a given area.

The quantizer 3003 allocates the number of gray levels to each color as follows. That is, as described previously, the quantizer 3003 quantizes light ink into nine values (e.g., FIG. 8) and dark ink into five values (e.g., FIG. 6), in order to suppress the graininess of the connecting portion between the light and dark inks.

More specifically, in the 6-color ink system using Y, M, C, K, LC, and LM, the quantizer 3003 quantizes data LC and LM into nine values and data Y, M, C, and K into five values, and outputs the quantized data to the compressor 3004.

As a data unit handled by the host computer 1001, a bit length of $2^n$ is usually convenient for the processing efficiency. In the example shown in FIG. 6, four bits are necessary to express five values. This is a waste of the information amount.

If the number of gray levels is reduced to four values, two bits are enough to express four values, so the efficiency increases in respect of the information amount. However, the quality of tone is lost accordingly. Therefore, the compressor 3004 shown in FIG. 3 performs lossless compression for 5-valued data quantized into code information.

Principle of Compression

The principle of the compression performed by the compressor 3004 will be explained below.

In the example shown in FIG. 6, four bits are necessary to express five values. If data having five values for each pixel is collected into three pixels, the number of states is 5×5×5=125, and this is contained in eight bits (256).

That is, if no compression is performed, the information amount is 4 bits×3 pixels=12 bits. This information amount can be reduced to 8 bits/12 bits=⅔ by compression into eight bits.

In the example shown in FIG. 8, four bits are similarly required to express nine values. However, the information amount is not so wasted as when five values are expressed. In addition, the compression process as explained above complicates the processing configuration. This increases the possibility of a problem such as a lowering of the processing speed. Hence, no such compression process as explained above is performed when nine values are to be expressed.

Figure 9:
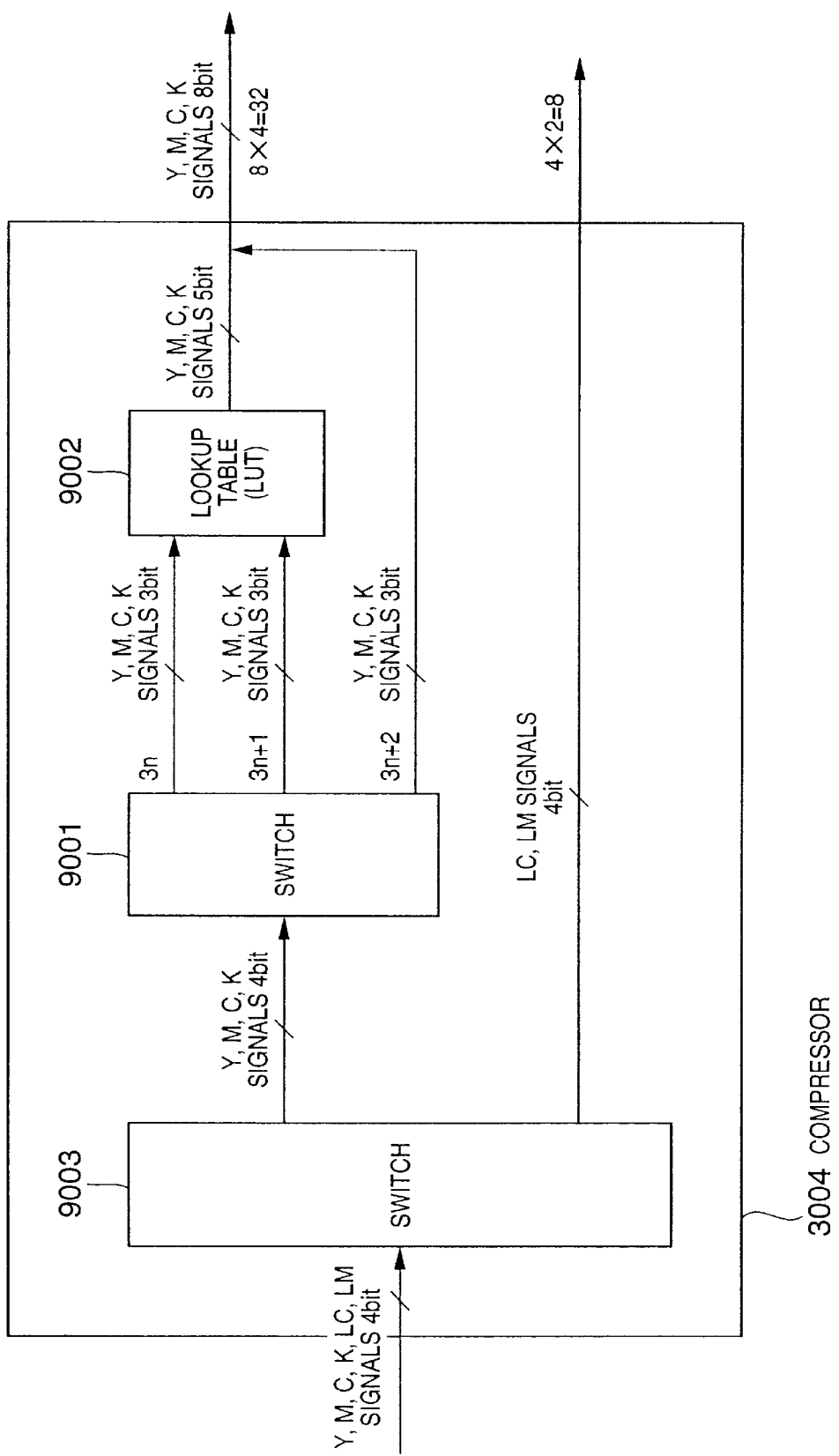
FIG. 9 is a block diagram for explaining the arrangement of a compressor according to the first embodiment.

Compressor: FIG. 9

FIG. 9 is a block diagram for explaining the configuration of the processing by the compressor 3004 shown in FIG. 3.

A switch 9003 separates input 6-color data of Y, M, C, K, LC, and LM into 5-valued data to be compressed, i.e., 4-bit data of each of Y, M, C, and K, and 9-valued data not to be compressed, i.e., 4-bit data of each of LC and LM.

Figure 10:
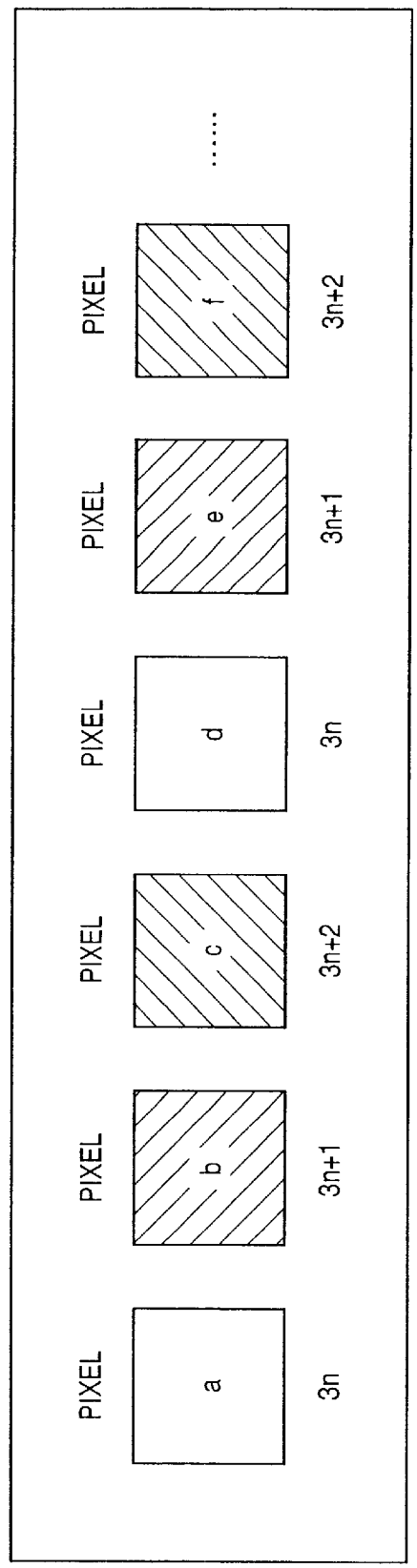
FIG. 10 is a view for explaining the procedure of a data compressor according to the first embodiment.

As shown in FIG. 10, a switch 9001 receives, for each pixel, 4-bit pixel data quantized into five values, and separately outputs the input pixel data in three pixel periods of 3N, 3N+1, and 3N+2.

In the example shown in FIG. 10, pixels a and d are output as the 3Nth pixels, pixels b and e are output as the (3N+1)th pixels, and pixels c and f are output as the (3N+2)th pixels.

Although each input pixel data has four bits, five values can be expressed by five types of bit combinations, e.g., '0000', '0001', '0010', '0011', and '0100', so the most significant bit '0' is unnecessary. Therefore, the switch 9001 need only output three bits excluding the most significant bit.

The 3Nth and (3N+1)th pixel data distributed between the three pixel periods by the switch 9001 is input to a lookup table (LUT) 9002. In accordance with a table example shown in FIG. 11, data having 3×2=6 bits is converted into 5-bit data.

Although the LUT 9002 reduces the data by one bit, no information is lost. This is so because 3-bit data of one pixel has only data of five values, so 5×5=25 types of information are present even if data of two pixels are gathered. Accordingly, information of two pixels can be expressed with no missing by five bits.

In addition, the 5-bit data as output data from the LUT 9002 and the three bits which are the (3N+2)th pixel data as output data from the switch 9001 are gathered and output as 8-bit information.

Note that only the input data of each of Y, M, C, and K quantized by five values is output as 8-bit data by the compression process explained above. LC and LM quantized by nine values are output as information having four bits per pixel, after separated by the switch 9003, without performing the compression process described above.

Packing Unit: FIG. 3

The compressed 5-valued data of Y, M, C, and K and the uncompressed 9-valued data of LC and LM are input from the compressor 3004 explained in FIGS. 3 and 9 to a packing unit 3005 where these data are packed into a data unit transferred from the host computer 1001 to the inkjet printer 1003.

Figure 5:
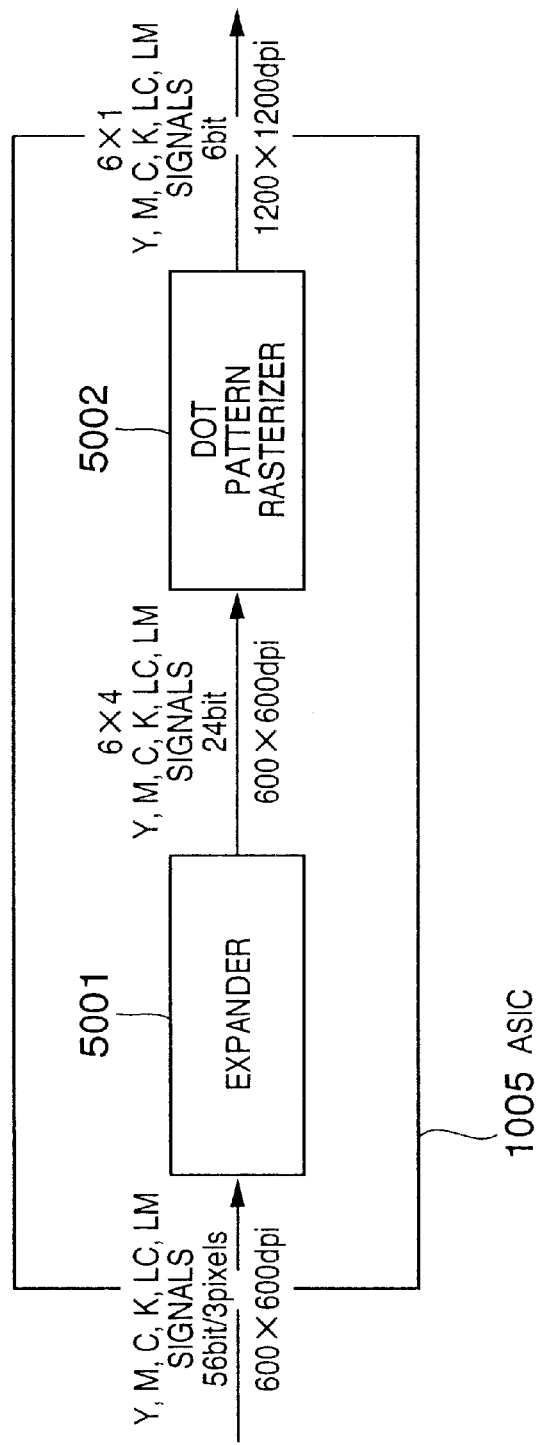
FIG. 5 is a block diagram for explaining the arrangement of a data rasterizer according to the embodiment of the present invention.

Decoding of Compressed Data: FIG. 5

A process during which the data compressed by the printer driver 1002 of the host computer 1001 is transmitted to the inkjet printer 1003 and decoded will be described below.

FIG. 5 is a block diagram showing the internal arrangement of the ASIC 1005 of the inkjet printer 1003 shown in FIG. 1. Processing performed in this ASIC 1005 will be explained below with reference to FIG. 5.

An expander 5001 expands 56-bit/3-pixel data received from the host computer 1001, thereby converting the data into the uncompressed 24-bit data of Y, M, C, K, LC, and LM.

The dot pattern rasterizer 5002 rasterizes the input data into the dot patterns shown in FIGS. 6 and 8.

Expander

Figure 12:
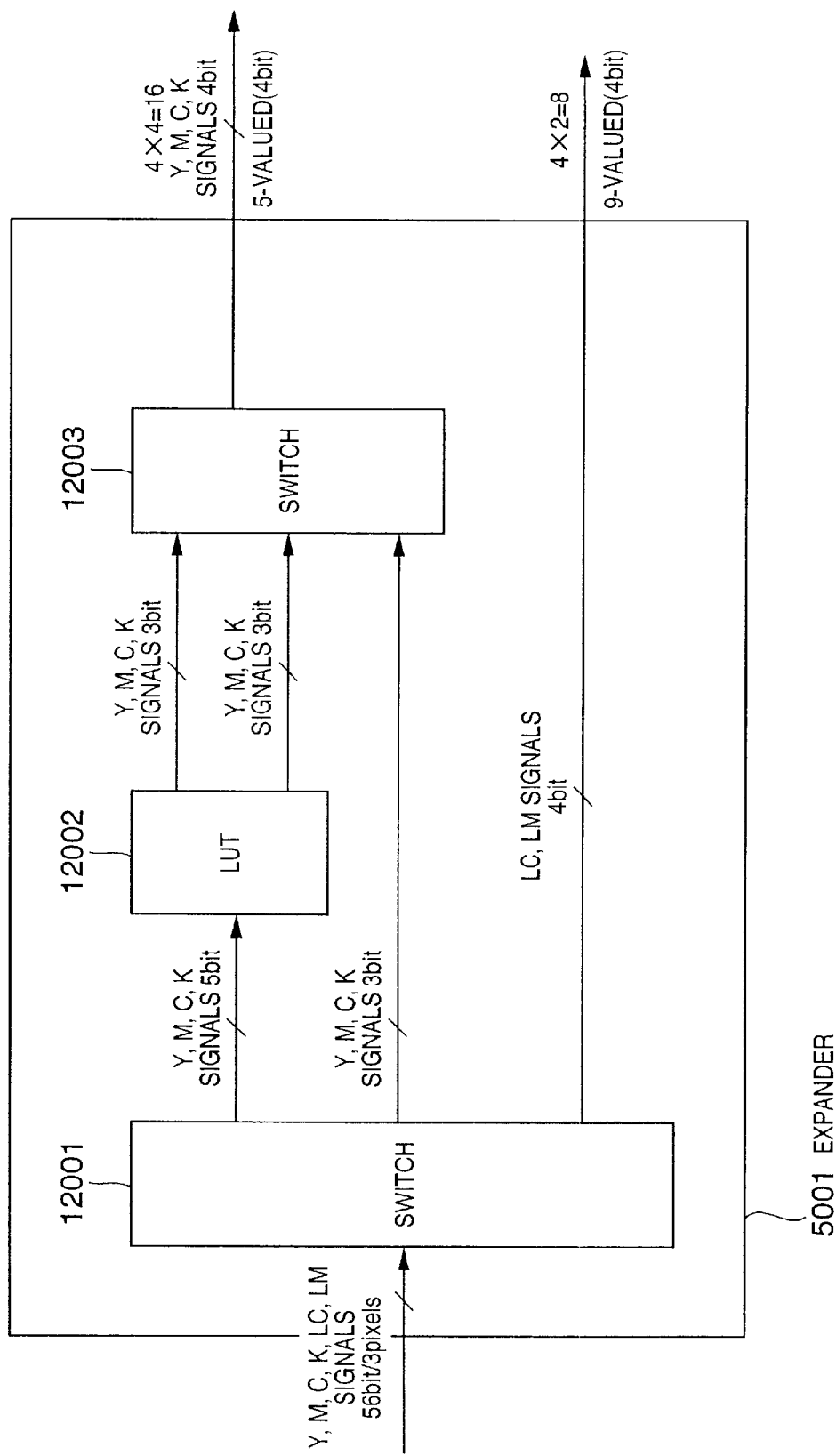
FIG. 12 is a block diagram for explaining the arrangement of an expander according to the first embodiment.

FIG. 12 is a block diagram showing the internal arrangement of the expander 5001 shown in FIG. 5. Processing by the expander 5001 shown in FIG. 5 will be explained with reference to FIG. 12.

The data of Y, M, C, K, LC, and LM transmitted from the printer driver 1002 of the host computer 1001 contains both compressed data and uncompressed data. A switch 12001 separates the received data into the compressed data of Y, M, C, and K and the uncompressed data of LC and LM.

Next, of the data separated by the switch 12001, five bits cut out from 8-bit data of each of Y, M, C, and K are input to the LUT 9002 of the compressor 3004 and to an LUT 12002, and converted into 3-bit pixel data of two pixels.

Subsequently, the pixel data of two pixels output from the LUT 12002 and pixel data of three remaining pixels of the eight bits are input to a switch 12003 to restore pixel data of three consecutive pixels.

Finally, to restore the dot pattern shown in FIG. 6 or 8 on the basis of the quantized pixel data, the output pixel data from the switch 12003 is input to the dot pattern rasterizer 5002.

In this embodiment as described above, a color image can be given a tone by printing the image with inks of colors such as LC and LM having relatively low densities. Since the tone of such a color having a relatively low density is important, this color is given a larger number of (e.g., nine) gray levels than colors (Bk, C, M, and Y) having relatively high densities. Also, the number of (e.g., five) gray levels which increases the compression ratio is used for the colors (Bk, C, M, and Y) having relatively high densities. Accordingly, data subjected to image processing can be compressed, and this reduces the data amount to be transmitted. A color having a relatively low density herein mentioned is a color similar to a color such as Bk, C, M, or Y and having an optical reflection density lower than that of the color. (This optical reflection density is obtained by measuring regions of a printing medium printed by equal amounts of inks.) The number of gray levels is not limited to nine but can be any other value.

In this embodiment, if the compression process described above is not performed for any of Y, M, C, K, LC, and LM, data having 4 bits/color×6 colors=24 bits is transmitted. When only Y, M, C, and K are compressed and LC and LM are left uncompressed, 8/3 bits/color×4 colors+4 bits/color×2 colors=18.7 bits.

Accordingly, data to be transmitted can be reduced to 18.7/24×100=78% by the compression process explained in this embodiment. That is, image data of about 22% can be compressed without any deterioration of the image quality.

Second Embodiment

An image processing system of the second embodiment will be described below.

Figure 13:
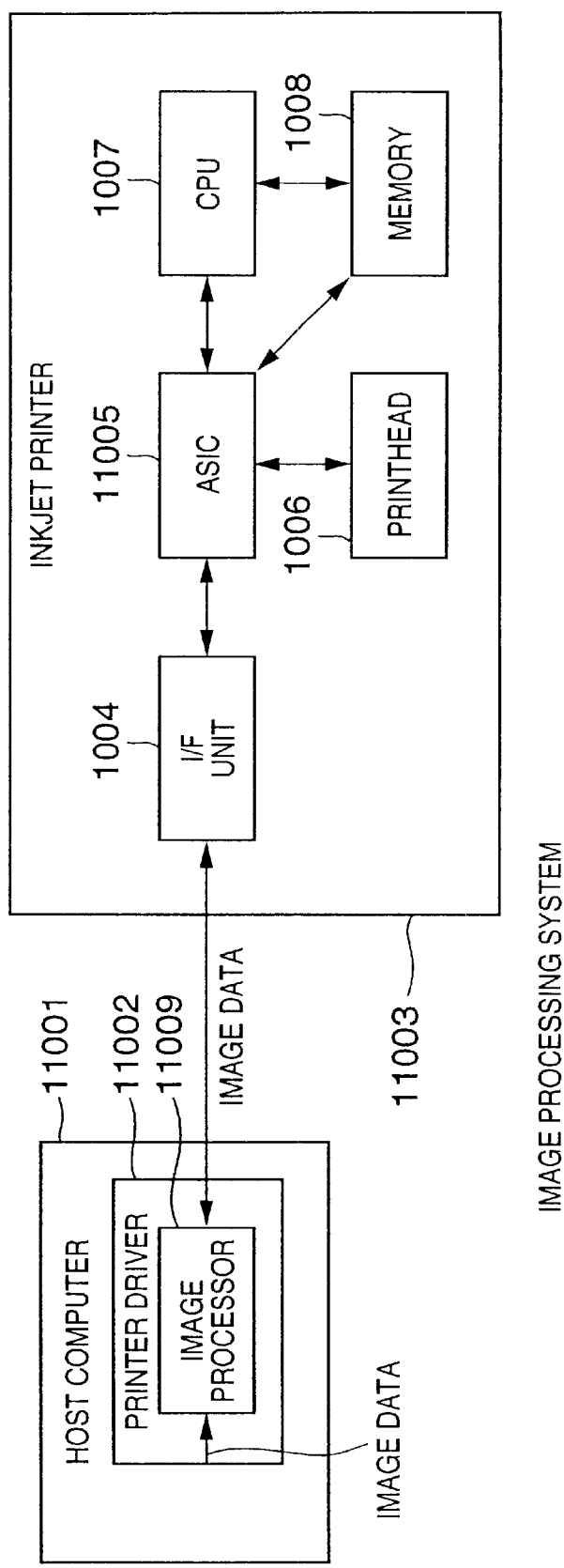
FIG. 13 is a block diagram for explaining the whole configuration of an image processing apparatus and image printing apparatus according to the second embodiment of the present invention.

The whole configuration of the image processing system of this second embodiment shown in FIG. 13 can be substantially the same as that of the image processing system shown in FIG. 1 explained in the first embodiment. Although not shown, details of the arrangement of the image processing system of the second embodiment are also substantially the same as those of the arrangement of the image processing system of the first embodiment already explained.

In the following explanation of the image processing system of the second embodiment, therefore, a repetitive description of the same portions as in the image processing system of the first embodiment will be omitted, and only different portions will be explained.

In this second embodiment, the combination of the number of gray levels and color data and the combination of compression and non-compression explained in the first embodiment can be designated for each print mode.

Figure 7A:
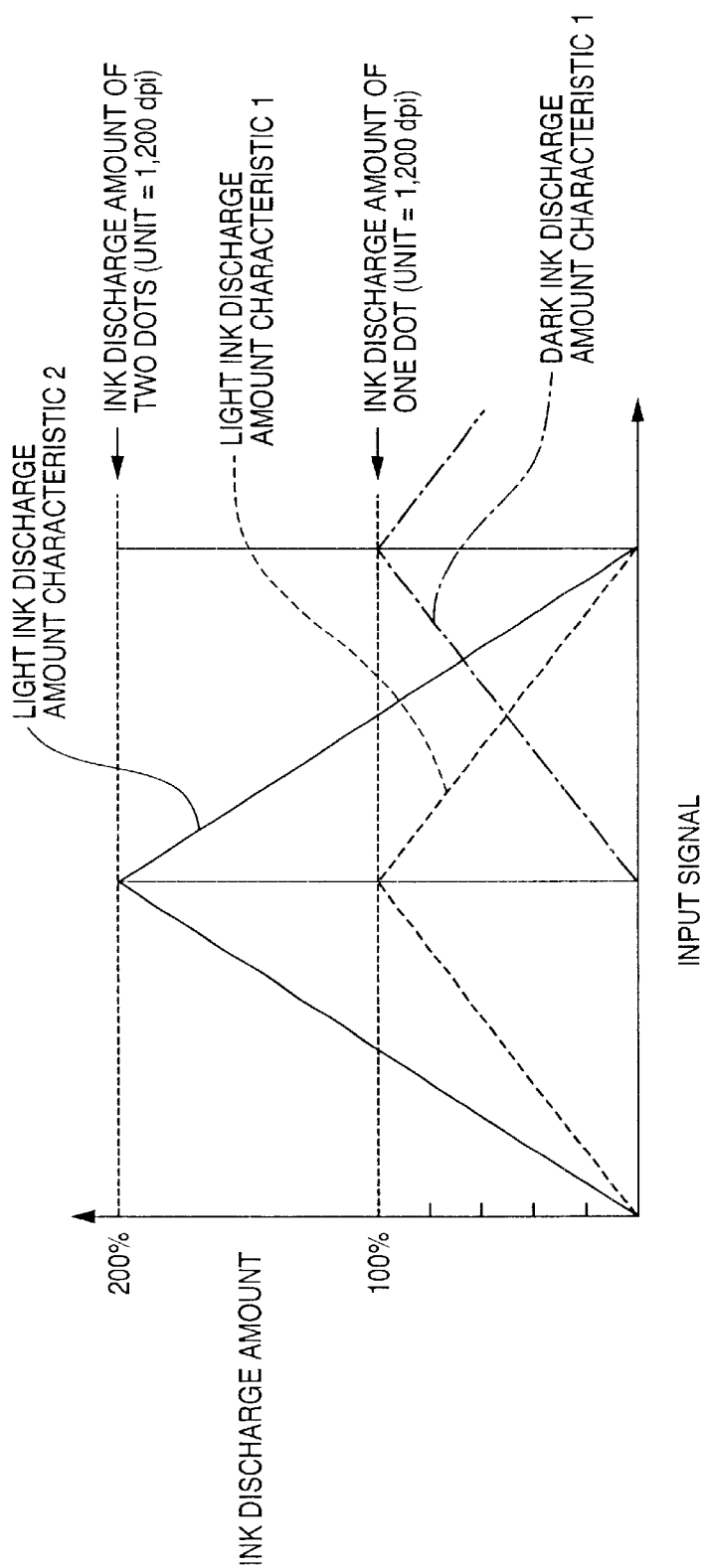
FIG. 7A is a graph for explaining the relationships between the input signal and the discharge amount when both dark ink and light ink are used and when the light ink alone is used.

The discharge amount characteristics of dark and light inks as shown in FIG. 7A used in the first embodiment largely depend upon the characteristics of a medium used.

Especially in an inkjet printer, the color generation characteristics, the graininess of each gray level, and the dischargeable ink amount change in accordance with the type of printing medium, e.g., plain paper, coated paper, or glossy paper.

The light ink discharge amount characteristic 2 by which only light ink is discharged to 200% as shown in FIG. 7A is effective when the light ink tone characteristic of a medium rises in density almost linearly up to 200%, and when the medium permits an ink discharge amount of 200% or more.

An example of the medium showing this characteristic is glossy paper.

For a medium such as plain paper, a discharge amount characteristic such as the light ink discharge characteristic 2 shown in FIG. 7A is almost ineffective. This is so because the graininess of dark ink alone is originally inconspicuous, the density almost saturates even when light ink is discharged up to 200%, and the ink discharge amount of the medium is not so large.

In addition, even when a glossy paper medium is used, a mode by which no compression is performed can be used if the engine throughput of a printer is sufficiently low. That is, if all six colors can be converted into nine values and transferred as a total of 24 bits of Y, M, C, K, LC, and LM from a printer driver to a printer, a mode by which the image quality is improved by giving priority to the tone can be used.

An arrangement capable of detecting the number of gray levels and discriminating between "presence" and "absence" of compression for each color as in the second embodiment will be described below.

Image Processor

Figure 14:
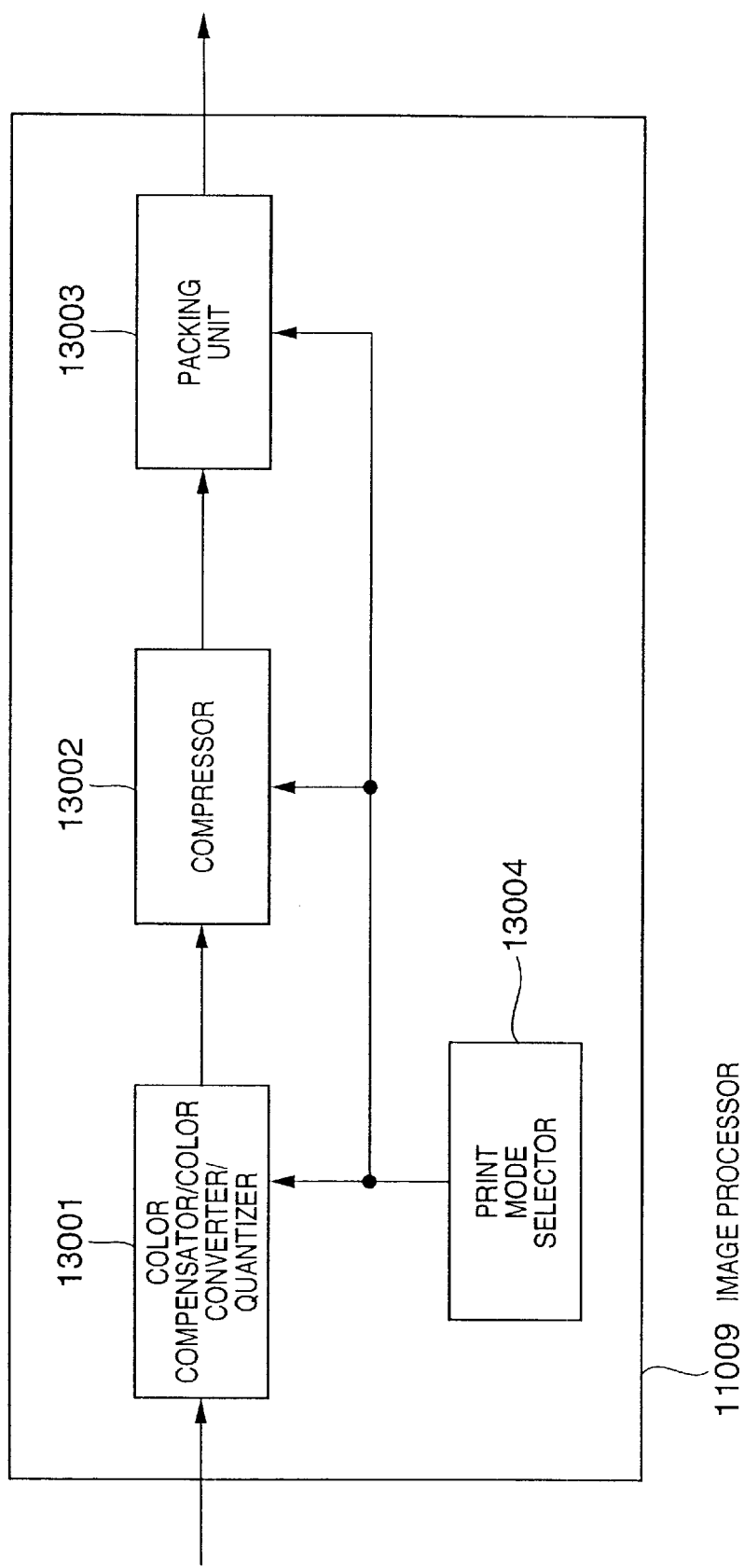
FIG. 14 is a block diagram for explaining the arrangement of an image processor on a printer driver according to the second embodiment of the present invention.

FIG. 14 is a view for explaining the configuration from a color compensator/color converter/quantizer 13001 to a packing unit 13003 in an image processor 11009 of a printer driver 11002.

Processing by this image processor 11009 will be explained below with reference to FIG. 14.

The image processor 13001 performs the processes performed by the color compensator 3001, the color converter 3002, and the quantizer 3003 shown in FIG. 3 explained in the first embodiment.

On the basis of a print mode designated on the UI (User Interface) of the printer driver by the user, a print mode selector 13004 allows the image processor 13001 to perform processing by using a color compensation table, a color conversion table, and the number of gray levels of quantization for each color, optimum for the designated print mode.

For example, in a print mode using plain paper, increasing the number of gray levels does not greatly improve the image quality. Therefore, all of Y, M, C, K, LC, and LM are processed as 5-valued data (print mode 1)

In a normal print mode using glossy paper, only color data giving importance to the number of gray levels, i.e., only light ink data of LC and LM are processed as 9-valued data as in the first embodiment, and remaining Y, M, C, and K are processed as 5-valued data (print mode 2).

In an image quality preferential mode using glossy paper, gray levels of all color data are processed as 9-valued data (print mode 3).

A compressor 13002 controls compression on the basis of the number of gray levels of each color in each print mode. More specifically, the compressor 13002 controls a switch 12001 shown in FIG. 12, thereby controlling compression with the same processing configuration.

For example, all color data are compressed in print mode 1 (all of Y, M, C, K, LC, and LM are 5-valued data). Therefore, compression is performed such that all color data of Y, M, C, K, LC, and LM pass through the path indicated by Y, M, C, and K in the switch 12, and three pixels are gathered and packed into eight bits. Print mode 2 is the same as in the first embodiment, so the paths of the individual colors shown in FIG. 12 are directly used.

In print mode 3 (all of Y, M, C, K, LC, and LM are 9-valued), no compression is performed. Therefore, color data passes through the path indicated by LC and LM, i.e., the path bypassing the compression shown in FIG. 12.

The packing unit 13003 shown in FIG. 13 packs each color data which is given the optimum number of gray levels and compressed in accordance with each print mode as described above, and at the same time adds header information which can be discriminated by the printer. This header information is transferred only once before transmission of print data. The header information is as shown in FIG. 16.

The first one byte is a flag indicating the compression mode of each color of data to be transferred. This value takes 0, 1, or 2:1 indicates a mode in which all colors are compressed; 0, a mode in which no compression is performed; and 2, a mode in which some colors are compressed and others are not.

The subsequent data which continues over six pairs of two bytes, i.e., a total of twelve bytes, contains flags each indicating the number of gray levels and the presence/absence of compression of the corresponding color. These flags are arranged in the order of Y, M, C, K, LC, and LM.

In print mode 1, all colors are 5-valued and compressed, so '05 01' continues. In print mode 2, Y, M, C, and K are 5-valued and compressed, so '05 01' continues for four colors, but '09 00' continues for two colors because LC and LM are 9-valued and not compressed.

In print mode 3, all colors are 9-valued and not compressed, so '09 00' continues for six colors. These pieces of header information are attached to the head of image data.

Arrangement of ASIC: FIG. 15

FIG. 15 shows data rasterization performed in an ASIC 11005 of the inkjet printer according to this embodiment.

A print mode determination unit 15000 determines the number of gray levels and the "presence" or "absence" of compression of each color of transmitted image data, in accordance with header information attached by the packing unit 13003 shown in FIG. 14. On the basis of the determination result, an expander 15001 expands each color data.

The internal processing of this expander 15001 is analogous to that of the expander 5001 (FIG. 12) explained in the first embodiment. On the basis of the determination result from the print mode determination unit described above, the switch 12001 switches the data paths for each color data.

If print mode 1 is detected, all colors of the data are 5-valued and compressed. Therefore, the switch 12001 supplies the data such that all of Y, M, C, K, LC, and LM pass through the switch 12003.

Print mode 2 is the same as in the first embodiment.

In print mode 3, all colors are 9-valued and not compressed, so all these colors are supplied to the through path, rather than to the switch 12003.

In this embodiment as described above, it is possible to select an optimum number of gray levels and an optimum compression process in accordance with the medium and the printing quality, thereby performing compression optimum for each print mode. Accordingly, in a mode in which almost no influence appears on an image even if the number of gray levels is small, the number of gray levels is so chosen as to give preference to compression. This can efficiently reduce the amount of data to be transferred.

Also, in a mode in which the engine speed is sufficiently high, a possible maximum number of gray levels is chosen, and no compression is performed. This makes it possible to provide a print mode by which the image quality is given the highest priority.

In the above embodiments, a droplet discharged from the printhead is an ink droplet, and a liquid contained in the ink tank is ink. However, the content is not limited to ink. For example, the ink tank can also contain a material such as a processing solution discharged to a printing medium in order to increase the fixing properties and water resistance of a printed image and improve the quality of the image.

The above embodiments can increase the density and resolution of printing by using an inkjet printing system which includes a means (e.g., an electrothermal converter or a laser beam) for generating thermal energy as energy to be used to discharge ink, and which causes the state change of ink by this thermal energy.

As a representative configuration and principle, it is preferable to use the basic principle disclosed in, e.g., U.S. Pat. Nos. 4,723,129 or 4,740,796. This system is applicable to both a so-called on-demand type and continuous type. The on-demand system is particularly effective for the following reason. That is, at least one driving signal which corresponds to printing information and which gives a rapid temperature rise exceeding nuclear boiling is applied to an electrothermal converter placed in a position corresponding to a sheet or channel holding a liquid (ink). This causes the electrothermal converter to generate thermal energy, thereby causing film boiling on the thermal action surface of the printhead. Consequently, a bubble can be formed in the liquid (ink) in one-to-one correspondence with the driving signal.

By the growth and contraction of this bubble, the liquid (ink) is discharged through an orifice to form at least one droplet. The driving signal is more preferably a pulse signal. This is so because bubbles are grown and contracted immediately and properly, and this can achieve liquid (ink) discharge excellent in particularly responsiveness.

This pulse driving signal is suitably the one described in U.S. Pat. Nos. 4,463,359 or 4,345,262. Note that superior printing can be performed by using the conditions described in U.S. Pat. No. 4,313,124 which is an invention relating to the temperature rise on the thermal action surface.

The construction of the printhead can be combinations (linear channels or right-angle channels) of orifices, channels, and electrothermal converters disclosed in the specifications described above. The present invention also includes a construction described in U.S. Pat. Nos. 4,558,333 or 4,459,600 which discloses a construction in which the thermal action surface is positioned in a bent region. In addition, it is also possible to use a construction based on Japanese Patent Laid-Open No. 59-123670 which discloses a construction in which a common slot is used as an orifice of an electrothermal converter, or Japanese Patent Laid-Open No. 59-138461 which discloses a construction in which an opening which absorbs the pressure wave of thermal energy is used as an orifice.

Furthermore, a full-line type printhead having a length corresponding to the width of a maximum printing medium usable by a printing apparatus can have an arrangement which satisfies the length by combining a plurality of printheads as disclosed in the specifications described above, or a single integrated printhead.

Additionally, the printhead is not limited to a cartridge type printhead explained in the above embodiments, which has an ink tank integrated with the printhead itself. It is also possible to use an exchangeable chip-type printhead which, when attached to the apparatus main body, can electrically connect to the apparatus main body and can receive ink from the apparatus main body.

It is preferable to add, e.g., a recovery means for the printhead and a preliminary means to the arrangement of the printing apparatus explained above, since this further stabilizes the printing operation. Practical examples are a capping means, cleaning means, and pressurizing means or suction means for the printhead, and a preheating means which is an electrothermal converter, another heating device, or the combination of the both. It is also effective for stable printing to include a predischarge mode for performing discharge different from printing.

Furthermore, the print mode of the printing apparatus is not limited to a print mode using only a main color such as black. That is, the printing apparatus can also include at least one of a multi-color mode using different colors and a full-color print mode using color mixing.

Each embodiment has been explained on the basis of the assumption that ink is a liquid. However, it is also possible to use ink which solidifies at room temperature or lower, or ink which softens or liquefies at room temperature. Alternatively, ink need only liquefy when a printing signal is applied, because the inkjet system generally performs temperature control by adjusting the temperature of ink itself within the range of 30° C. to 70° C. so that the viscosity of the ink falls within the range of stable discharge.

Additionally, to positively prevent a temperature rise by thermal energy by using this temperature rise as the energy of the state change from the solid state to the liquid state of ink, or to prevent evaporation of ink, ink which solidifies when left to stand and liquefies when heated can also be used. In either case, the present invention is similarly applicable to a system using ink which does not liquefy unless thermal energy is applied. Examples of the ink are ink which liquefies when given thermal energy corresponding to a printing signal and is discharged as liquid ink, and ink which has started solidifying when arriving at a printing medium.

As described in Japanese Patent Laid-Open No. 54-56847 or 60-71260, any of these inks can be held as a liquid or solid in a recess or through hole of a porous sheet and opposed in this state to an electrothermal converter. In the present invention, executing the above-mentioned film boiling method is most effective to each ink described above.

Furthermore, the form of the printing apparatus according to the present invention can be any of a printing apparatus integrated with or separated from an image output terminal of an information processing apparatus such as a computer, a copying apparatus combined with a reader or the like, and a facsimile apparatus having a transmitting/receiving function.

Other Embodiment

The present invention can be applied to a system constituted by a plurality of devices (e.g., a host computer, interface, reader, and printer) or to an apparatus (e.g., a copying machine or facsimile apparatus) comprising a single device.

Further, the object of the present invention can also be achieved by supplying a storage medium (or recording medium) recording program codes of software for implementing the functions of the above embodiments to a system or apparatus, and reading out and executing the program codes stored in the storage medium by a computer (or a CPU or MPU) of the system or apparatus. In this case, the program codes read out from the storage medium implement the functions of the present invention, and the storage medium storing these program codes constitutes the invention. Furthermore, besides the functions of the above embodiments are implemented by executing the readout program codes by the computer, the present invention includes a case where an OS (Operating System) or the like running on the computer performs part or the whole of actual processing in accordance with designations by the program codes and thereby implements the functions of the above embodiments.

Furthermore, the present invention also includes a case where the program codes read out from the storage medium are written in a memory of a function extension card inserted into the computer or of a function extension unit connected to the computer, and, in accordance with designations by the program codes, a CPU or the like of the function extension card or function extension unit performs part or the whole of actual processing and thereby implements the functions of the above embodiments.

In the image processing system of the present invention as described above, for color image data to be transmitted to the image printing apparatus (which uses, e.g., six colors Y, M, C, Bk, LC, and LM), the image processing apparatus quantizes colors (LC and LM) which give importance to the quality of tone by a large number of gray levels (e.g., nine values), and quantizes colors (Y, M, C, and Bk) which give no importance to the quality of tone by the number of gray levels (e.g., five values) by which the compression efficiency is improved. After that, the image processing apparatus compresses the data to reduce the transmission data amount. The image printing apparatus prints the image of the received image data by directly using the uncompressed data and expanding the compressed data.

In this manner, the volume of data to be processed is reduced while the quality of tone of an image to be printed is held. This makes it possible to reduce the load of data transfer and reduce the memory capacity for data storage in the image printing apparatus. Also, a color whose tone quality is important is given a large number of gray levels and is not compressed. For a color whose tone quality is not important, the number of gray levels is reduced to one by which the compression efficiency is improved, as long as the image quality is not adversely affected, thereby increasing the compression efficiency. In this way, the transfer data amount is reduced while the quality of an image to be printed is maintained. This can achieve high-speed data transfer.

As described above, the present invention can provide an image processing apparatus and image processing method capable of outputting a color image to an image printing apparatus by reducing the information amount of each color component of the image by a method suited to the color component without deteriorating the quality of the image.

The present invention can also provide an image printing apparatus and its control method capable of printing a color image without deteriorating the quality of the image, on the basis of output image data from the image processing apparatus described above.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus for outputting multi-level color image data by reducing the information amount of the data, comprising:

first quantizing means for quantizing a color component of the multilevel color image data into N1 values, and outputting the color component as a K1-bit code capable of expressing the N1 values;

second quantizing means for quantizing a color component of the multilevel color image data into N2 values larger than the N1 values, and outputting the color component as a K2-bit code capable of expressing the N2 values;

quantization selecting means for selecting one of said first and second quantizing means in accordance with a color component of the multilevel color image data;

converting means for collecting the K1-bit codes of M pixels and converting the collected K1-bit codes into a code having L1 bits less than K1×M, if said quantization selecting means selects said first quantizing means; and output means for collectively outputting output data from said converting means as data formed for every predetermined number of bits.

2. The apparatus according to claim 1, wherein if said second quantizing means is selected, the K2-bit code is output without being converted.

3. The apparatus according to claim 1, wherein said quantization selecting means uses said first quantizing means for a color component to be printed in ink having a relatively high density, and uses said second quantizing means for a color component to be printed in ink having a relatively low density.

4. The apparatus according to claim 3, wherein the low-density color components are light cyan and light magenta, and the high-density color components are cyan, magenta, yellow, and black.

5. The apparatus according to claim 1, wherein the predetermined number of bits is a natural multiple of the L1 bits, and the data formed for every predetermined number of bits is transferred to an image printing apparatus.

6. The apparatus according to claim 1, wherein said quantization selecting means comprises selecting means for selecting one of said first and second quantizing means on the basis of a print mode which designates selection of one of said first and second quantizing means.

7. The apparatus according to claim 6, wherein said selecting means selects one of said first and second quantizing means in accordance with one of a type of printing apparatus for outputting the image data, a type of medium, and a resolution.

8. An image printing apparatus for printing an image on the basis of color image data output by reducing the information amount thereof, comprising:

separating means for separating the color image data into a compressed code and an uncompressed code for every predetermined number of bits, in accordance with color components of the color image data;

restoring means for restoring the compressed code separated by said separating means; and image printing means for printing the image by using the uncompressed code and the restored code.

9. The apparatus according to claim 8, wherein the compressed code is formed by collecting K1-bit codes, capable of expressing N1 values, of M pixels, and compressing the collected K1-bit codes into a code having L1 bits less than K1×M, and the uncompressed code is a K2-bit code capable of expressing N2 values.

10. The apparatus according to claim 9, wherein said restoring means restores the compressed L1 bit code into the K1-bit codes of M pixels.

11. The apparatus according to claim 9, wherein said image printing means prints the image by using the K2-bit code and the K1-bit code.

12. The apparatus according to claim 8, wherein, of color components of the color image data, the compressed code is a color component to be printed in ink having a relatively high density, and the uncompressed code is a color component to be printed in ink having a relatively low density.

13. The apparatus according to claim 12, wherein the low-density color components are light cyan and light magenta inks, and the high-density color components are cyan, magenta, yellow, and black inks.

14. The apparatus according to claim 8, wherein the predetermined number of bits is a natural multiple of the L1 bits.

15. The apparatus according to claim 8, wherein a printing operation is performed using a printhead.

16. The apparatus according to claim 15, wherein said printhead comprises a plurality of printing elements including an electrothermal converter which generates thermal energy as energy for discharging ink.

17. A printer driver which is executed by an information processing apparatus, and which outputs, to an image printing apparatus, multilevel color image data to be printed by reducing the information amount of the data, comprising:
   a first quantization module for quantizing a color component of the multilevel color image data into N1 values, and outputting the color component as a K1-bit code capable of expressing the N1 values;
   a second quantization module for quantizing a color component of the multilevel color image data into N2 values larger than the N1 values, and outputting the color component as a K2-bit code capable of expressing the N2 values;
   a quantization selecting module for selecting one of said first and second quantization modules in accordance with a color component of the multilevel color image data;
   a converting module for collecting the K1-bit codes of M pixels and converting the collected K1-bit codes into a code having L1 bits less than K1×M, if said quantization selecting module selects said first quantization module;
   a non-converting module for outputting the K2-bit code without conversion if said quantization selecting module selects said second quantization module; and
   an output module for collectively outputting output data from said converting and non-converting modules as data formed for every predetermined number of bits.

18. The driver according to claim 17, wherein said quantization selecting module uses said first quantization module for a color component to be printed in ink having a relatively high density, and uses said second quantization module for a color component to be printed in ink having a relatively low density.

19. The driver according to claim 18, wherein the low-density color components are light cyan and light magenta, and the high-density color components are cyan, magenta, yellow, and black.

20. The driver according to claim 17, wherein the predetermined number of bits is a natural multiple of the L1 bits, and the data formed for every predetermined number of bits is transferred to an image printing apparatus.

21. The driver according to claim 17, wherein said quantization selecting module comprises a selecting module for selecting one of said first and second quantization modules on the basis of a print mode which designates selection of one of said first and second quantization modules.

22. The driver according to claim 21, wherein said selecting module selects one of said first and second quantization modules in accordance with one of a type of printing apparatus for outputting the image data, a type of medium, and a resolution.

23. A control method of an image processing apparatus for outputting multilevel color image data by reducing the information amount of the data, comprising:
   the first quantization step of quantizing a color component of the multilevel color image data into N1 values, and outputting the color component as a K1-bit code capable of expressing the N1 values;
   the second quantization step of quantizing a color component of the multilevel color image data into N2 values (N2>N1), and outputting the color component as a K2-bit code capable of expressing the N2 values;
   the quantization selecting step of selecting one of the first and second quantization steps in accordance with a color component of the multilevel color image data;
   the conversion step of collecting the K1-bit codes of M pixels and converting the collected K1-bit codes into a code having L1 (K1×M>L1) bits, if the first quantization step is selected in the quantization selecting step; and
   the output step of collectively outputting output data from the conversion step as data formed for every predetermined number of bits.

24. The method according to claim 23, wherein if the second quantization step is selected in the quantization selecting step, the K2-bit code is output without being converted.

25. The method according to claim 23, wherein in the quantization selecting step the first quantization step is used for a color component to be printed in ink having a relatively high density, and the second quantization step is used for a color component to be printed in ink having a relatively low density.

26. The method according to claim 25, wherein the low-density color components are light cyan and light magenta, and the high-density color components are cyan, magenta, yellow, and black.

27. The method according to claim 23, wherein the predetermined number of bits is a natural multiple of the L1 bits, and the data formed for every predetermined number of bits is transferred to an image printing apparatus.

28. The method according to claim 23, wherein the quantization selecting step comprises the selection step of selecting one of the first and second quantization steps on the basis of a print mode which designates selection of one of the first and second quantization steps.

29. The method according to claim 28, wherein in the selection step, one of the first and second quantization steps is selected in accordance with one of a type of printing method for outputting the image data, a type of medium, and a resolution.

30. A control method of an image printing apparatus for printing an image on the basis of color image data which is output by reducing the information amount thereof, comprising:
   the separation step of separating the color image data into a compressed code and an uncompressed code for every predetermined number of bits, in accordance with color components of the color image data;
   the restoration step of restoring the compressed code separated in the separation step; and
   the image printing step of printing the image by using the uncompressed code and the restored code.

31. The method according to claim 30, wherein the compressed code is formed by collecting K1-bit codes, capable of expressing N1 values, of M pixels, and compressing the collected K1-bit codes into a code having L1 bits less than K1×M, and the uncompressed code is a K2-bit code capable of expressing N2 values.

32. The method according to claim 31, wherein in the restoration step, the compressed L1 bit code is restored into the K1-bit codes of M pixels.

33. The method according to claim 31, wherein in the image printing step, the image is printed by using the K2-bit code and the K1-bit code.

34. The method according to claim 30, wherein, of color components of the color image data, the compressed code is a color component to be printed in ink having a relatively high density, and the uncompressed code is a color component to be printed in ink having a relatively low density.

35. The method according to claim 34, wherein the low-density color components are light cyan and light magenta, and the high-density color components are cyan, magenta, yellow, and black.

36. The method according to claim 30, wherein the predetermined number of bits is a natural multiple of the L1 bits.

37. A program capable of executing on a computer a control method of an image processing apparatus for outputting multilevel color image data by reducing the information amount of the data, wherein said program executes:

a first quantization module for quantizing a color component of the multilevel color image data into N1 values, and outputting the color component as a K1-bit code capable of expressing the N1 values;

a second quantization module for quantizing a color component of the multilevel color image data into N2 (N2>N1) values, and outputting the color component as a K2-bit code capable of expressing the N2 values;

a quantization selecting module for selecting one of said first and second quantization modules in accordance with a color component of the multilevel color image data;

a conversion module for collecting the K1-bit codes of M pixels and converting the collected K1-bit codes into a code having L1 (K1×M>L1) bits, if said quantization selecting module selects said first quantization module; and an output module for collectively outputting output data from said conversion module as data formed for every predetermined number of bits.

38. A computer-readable recording medium for executing a control method of an image processing apparatus for outputting multilevel color image data by reducing the information amount of the data, comprising:

a first quantization module for quantizing a color component of the multilevel color image data into N1 values, and outputting the color component as a K1-bit code capable of expressing the N1 values;

a second quantization module for quantizing a color component of the multilevel color image data into N2 (N2>N1) values, and outputting the color component as a K2-bit code capable of expressing the N2 values;

a quantization selecting module for selecting one of said first and second quantization modules in accordance with a color component of the multilevel color image data;

a conversion module for collecting the K1-bit codes of M pixels and converting the collected K1-bit codes into a code having L1 (K1×M>L1) bits, if said quantization selecting module selects said first quantization module; and an output module for collectively outputting output data from said conversion module as data formed for every predetermined number of bits.

39. A program capable of executing on a computer a control method of an image processing apparatus for outputting multilevel color image data by reducing the information amount of the data, wherein said program executes:

a separation module for separating the color image data into a compressed code and an uncompressed code for every predetermined number of bits, in accordance with color components of the color image data;

a restoration module for restoring the compressed code separated by the processing by said separation module; and an image printing module for printing the image by using the uncompressed code and the restored code.

40. A computer-readable recording medium for executing a control method of an image processing apparatus for outputting multilevel color image data by reducing the information amount of the data, comprising:

a separation module for separating the color image data into a compressed code and an uncompressed code for every predetermined number of bits, in accordance with color components of the color image data;

a restoration module for restoring the compressed code separated by the processing by said separation module; and an image printing module for printing the image by using the uncompressed code and the restored code.

* * * * *

UNITED STATES PATENT AND TRADEMARK OFFICE
CERTIFICATE OF CORRECTION

PATENT NO.    : 6,695,434 B2
DATED         : February 24, 2004
INVENTOR(S)   : Yuji Konno et al.

It is certified that error appears in the above-identified patent and that said Letters Patent is hereby corrected as shown below:

<u>Title page,</u>
Item [56], References Cited, FOREIGN PATENT DOCUMENTS, "56-123670" should read -- 59-123670 --.

<u>Column 1,</u>
Line 55, "in formation" should read -- information --.

<u>Column 2,</u>
Line 26, "prevent" should read -- present --.

<u>Column 5,</u>
Line 21, "L1 bit" should read -- L1-bit --.

<u>Column 11,</u>
Line 31, "cover" should read -- color --.

<u>Column 15,</u>
Line 31, "mode 1)" should read -- mode 1). --.

<u>Column 20,</u>
Line 51, "L1 bit" should read -- L1-bit --.

<u>Column 22,</u>
Line 61, "L1 bit" should read -- L1-bit --.

Signed and Sealed this

Twenty-fourth Day of August, 2004

JON W. DUDAS
*Director of the United States Patent and Trademark Office*